United States Patent
Ananian et al.

(10) Patent No.: US 11,586,688 B2
(45) Date of Patent: Feb. 21, 2023

(54) COMPUTERIZED ANONYMOUS PERMISSION-BASED COMMUNICATIONS SYSTEM WITH MICRO-CATALOG SERVER ENABLING PERMISSION-BASED THIRD-PARTY COMMUNICATIONS

(71) Applicant: INTENTIONIZE, LLC, San Diego, CA (US)

(72) Inventors: John Allen Ananian, Winchester, CA (US); James D. Bryan, Ladera Ranch, CA (US); Gautham Padmakumar Janardhan, Bangalore (IN); William J. Nahm, San Diego, CA (US)

(73) Assignee: INTENTIONIZE, LLC, San Diego, CA (US)

( * ) Notice: Subject to any disclaimer, the term of this patent is extended or adjusted under 35 U.S.C. 154(b) by 0 days.

(21) Appl. No.: 17/317,761

(22) Filed: May 11, 2021

(65) Prior Publication Data

US 2021/0357460 A1    Nov. 18, 2021

Related U.S. Application Data

(60) Provisional application No. 63/023,782, filed on May 12, 2020.

(51) Int. Cl.
*G06F 16/00* (2019.01)
*G06F 16/951* (2019.01)
(Continued)

(52) U.S. Cl.
CPC .......... *G06F 16/951* (2019.01); *G06F 3/1462* (2013.01); *G06F 16/908* (2019.01);
(Continued)

(58) Field of Classification Search
CPC .... G06F 16/908; G06F 16/951; G06F 16/954; G06F 16/955; G06F 16/1462; G06F 16/9538
(Continued)

(56) References Cited

U.S. PATENT DOCUMENTS 9,430,663 B2 * 8/2016 Hsu .................. H04L 63/105
10,140,392 B1 * 11/2018 Bowen .............. G06Q 50/184
(Continued)

OTHER PUBLICATIONS

ISA/United States Patent and Trademark Office, Notification of Transmittal of the International Search Report and the Written Opinion of the International Searching Authority Issued in Application No. PCT/US21/31860, dated Aug. 10, 2021, 15 pages.

*Primary Examiner* — Ashish Thomas
*Assistant Examiner* — Rezwanul Mahmood
(74) *Attorney, Agent, or Firm* — Alleman Hall Creasman & Tuttle LLP

(57) ABSTRACT

A computerized anonymous permission-based communications system is provided, including a computing device configured to display in a primary GUI network-addressable content served by a server and to receive, via an alignment GUI, a user input indicating a catalog intention for the content. The catalog intention is transmitted to a micro-catalog server to create a user micro-catalog entry. The user micro-catalog entry is indexed by an index value of the content, and includes a programmatically selected subset of content associated with the content. The computing device is further configured to receive, via the alignment GUI, user inputted permissions associated with the user micro-catalog entry. The permissions define permissible third-party communications associated with the user micro-catalog entry. The computing device is further configured to display, in the alignment GUI, the user micro-catalog entry, and present, (Continued)

via the alignment GUI, a third-party communication authorized by the permissions.

24 Claims, 26 Drawing Sheets

(51) Int. Cl.
*G06F 16/954* (2019.01)
*G06F 3/14* (2006.01)
*G06F 16/908* (2019.01)
*G06F 16/9538* (2019.01)
*G06F 16/955* (2019.01)

(52) U.S. Cl.
CPC .......... *G06F 16/954* (2019.01); *G06F 16/955* (2019.01); *G06F 16/9538* (2019.01)

(58) Field of Classification Search
USPC .......................................................... 707/706
See application file for complete search history.

(56) References Cited

U.S. PATENT DOCUMENTS

| | | | |
|---|---|---|---|
| 2003/0028451 A1* | 2/2003 | Ananian | G06F 21/6254 705/26.42 |
| 2003/0050862 A1 | 3/2003 | Bleicken et al. | |
| 2007/0067297 A1 | 3/2007 | Kublickis | |
| 2010/0250360 A1* | 9/2010 | Ball | G06Q 30/02 705/14.29 |
| 2011/0153759 A1* | 6/2011 | Rathod | G06Q 30/0269 709/204 |
| 2012/0290448 A1* | 11/2012 | England | G06Q 30/0631 705/27.2 |
| 2013/0262481 A1* | 10/2013 | Bhandari | H04N 21/41407 707/750 |
| 2015/0379554 A1* | 12/2015 | Copeland | G06Q 30/0239 705/14.39 |
| 2021/0357460 A1* | 11/2021 | Ananian | G06F 3/147 |

* cited by examiner

PERMISSIONS INTERFACE 34

PERMISSION SELECTORS 180
MAKE PUBLIC SO THIRD PARTIES CAN VIEW THIS MICROCATALOG OR KEEP PRIVATE?
- ○ PRIVATE
- ● PUBLIC

THIRD PARTIES CAN COMMUNICATE WITH ME REGARDING THIS MICROCATALOG AS FOLLOWS

TYPE OF THIRD-PARTY — 182
- ☑ MERCHANTS
- ☑ OTHER USERS
- ☐ ADVISORS

MODE OF COMMUNICATION — 188
- ☑ MESSAGING
- ☐ VOICE
- ☐ ALLOW MICRO-CATALOGS TO BE DISPLAYED IN MY DOMAIN ALIGNED CATALOGS

TYPE OF COMMUNICATION — 184
- ☐ MFG INFORMATION AND UPDATES
- ☑ PROMOTION & OFFERS
- ☐ REVIEWS

CONTENT TYPE OF COMMUNICATION — 190
- ☑ EXACT PRODUCT/SERVICE
- ☐ SIMILAR PRODUCT/SERVICE
- ☐ PRODUCTS/SERVICES FREQUENTLY PURCHASED TOGETHER
- ☐ LOWER COST PRODUCTS/SERVICES ONLY
- ☐ FASTER DELIVERY PRODUCTS/SERVICES ONLY
- ☐ GEOGRAPHIC PROXIMITY IS WITHIN THRESHOLD

TIME PERIOD — 186
- ☐ INDEFINITE
- ☑ ONE DAY
- ☐ ONE WEEK
- ☐ CUSTOM

[Submit] [Cancel]

FIG. 9D

RANKING AND FILTERING INTERFACE 35

RANKING CRITERIA

220 {
- ☑ PRICE  ← 48
- ☐ SPEED OF DELIVERY
- ☐ REVIEW SCORES
- ☐ SIZE OF VENDOR
- ☐ GEOGRAPHIC PROXIMITY
}

FILTERING CRITERIA

222 {
- ☐ INCLUDE THESE MERCHANTS ONLY: [MULTISELECT DROP DOWN LIST ▶]  ← 47
- ☑ INCLUDE THESE CATEGORIES: [Computers, Laptops ▶]
- ☑ EXCLUDE THESE MERCHANTS ONLY: [ShadyMerchant]
- ☑ EXCLUDE THESE CATEGORIES: [Tablets]
}

[SUBMIT]
[CANCEL]

FIG. 9G

COMPUTERIZED ANONYMOUS PERMISSION-BASED COMMUNICATIONS SYSTEM WITH MICRO-CATALOG SERVER ENABLING PERMISSION-BASED THIRD-PARTY COMMUNICATIONS

CROSS REFERENCE TO RELATED APPLICATIONS

The present application is based upon and claims priority under 35 U.S.C. 119(e) to U.S. Provisional Patent Application No. 63/023,782, entitled COMPUTERIZED PERMISSION-BASED MARKETING SYSTEM, filed May 12, 2020, the entirety of which is hereby incorporated herein by reference for all purposes.

TECHNICAL FIELD

The present application relates generally to providing a computerized anonymous permissions-based communication system including a server that enables users to make user catalog entries for network-addressable content viewed on computer networks, and enter permissions to define whether third parties are authorized to communicate with them regarding the cataloged content. Users' identities remain anonymous to the third parties, and users' behaviors are not surreptitiously tracked by the system, thus ensuring the users' privacy.

BACKGROUND

The modern Internet is a highly surveilled place. Various user tracking and surveillance technologies including cookies, web beacons, browser/device fingerprinting, WIFI-positioning systems, GPS, embedded scripts, pixel trackers, HTML5 browser web storage, logging of IP addresses and device identifications, etc., have been developed that enable companies, governments, and nefarious groups to generate profiles on users gleaned from their interactions with servers in cyberspace. While the tracking of these interactions may enable convenience for the user in some situations, by, for example, enabling website functionality such as a stateful implementation of an e-commerce shopping cart, such extensive tracking presents a serious risk of becoming an unwanted invasion of the user's privacy. One such area of overreach that has many users concerned is the use of user profiles from surreptitious monitoring of Internet activity for marketing purposes on social media platforms. Doxing or doxxing is another harmful act, which consists of publicly revealing previously private personal information about an individual or organization, primarily by searching publicly available databases and social media websites, hacking, and social engineering.

With the rise of e-commerce and the increase in users shopping via the Internet, the above security and privacy issues are of particular concern. A user may spend several hours searching the Internet for particular information, all the while risking exposing their privacy and identity to unknown organizations and even potential hackers. Such exposure can lead to unwanted targeted advertising, identity theft, or worse. Additionally, even as the cost of customer acquisition continues to rise, e-commerce merchants are finding it a challenge to identify true consumer intentions within all of this Internet activity in order to connect with potential customers who actually intend to purchase a product such as is offered by the advertiser, thus resulting in an overwhelming amount of mistargeted advertising. This mistargeted advertising bombards the consumer with content they are not interested in, causing an unpleasant experience browsing the Internet and using applications that feature in-app advertisements. As a result, mistrust is generated in consumers, who feel that their Internet activity is being surreptitiously surveilled without their permission. Although hyperlinks and user accounts have enabled users to navigate the digital world of the Internet, these technologies alone cannot keep the public safe from the growing misuses and abuses plaguing modern Internet users' digital lives. In view of the above, technical challenges remain for ensuring privacy, anonymity, and choice for Internet users.

SUMMARY

To address the above issues, a computerized anonymous permission-based communications system is provided, including a computing device configured to communicate with a micro-catalog server and a server, the computing device including a processor, memory, and a display. The processor is configured to execute instructions using portions of the memory, to display a primary graphical user interface (GUI) and an alignment GUI on the display of the computing device, and display, in the primary GUI, network-addressable content served by the server. The processor is further configured to receive, via the alignment GUI, a user input indicating a catalog intention for the displayed network-addressable content. The catalog intention is transmitted to the micro-catalog server to cause the micro-catalog server to create a user micro-catalog entry for the network-addressable content. The user micro-catalog entry is indexed at the micro-catalog server by an index value of the network-addressable content in a database of the micro-catalog server, and includes a programmatically selected subset of text data, one or more images, and/or metadata associated with the network-addressable content. The processor is further configured to receive, via the alignment GUI, user inputted permissions associated with the user micro-catalog entry. The permissions including a plurality of user-input parameters defining permissible third-party communications associated with the user micro-catalog entry. The processor is further configured to display, in the alignment GUI, the user micro-catalog entry, and present, via the alignment GUI, a third-party communication that is authorized by the permissions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 9A-9I illustrate an embodiment in which an alignment GUI is displayed in a browser extension window and a primary GUI is displayed in a browser window, as shown in FIG. 4A. These figures illustrate a process of entering user input of a catalog intention for a web page (FIG. 9A), displaying a generated user micro-catalog entry (FIG. 9B), entering permissions associated with the user micro-catalog entry (FIGS. 9C-9D), displaying aligned micro-catalog entries (FIG. 9E), entering ranking criteria for aligned micro-catalogs (FIGS. 9F-9G), displaying a ranked and filtered list of aligned micro-catalog entries in the alignment GUI (FIG. 9H), and displaying third-party communications allowed by the entered permissions in the form of a chat interface in the alignment GUI (FIG. 9I).

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

Figure 1:
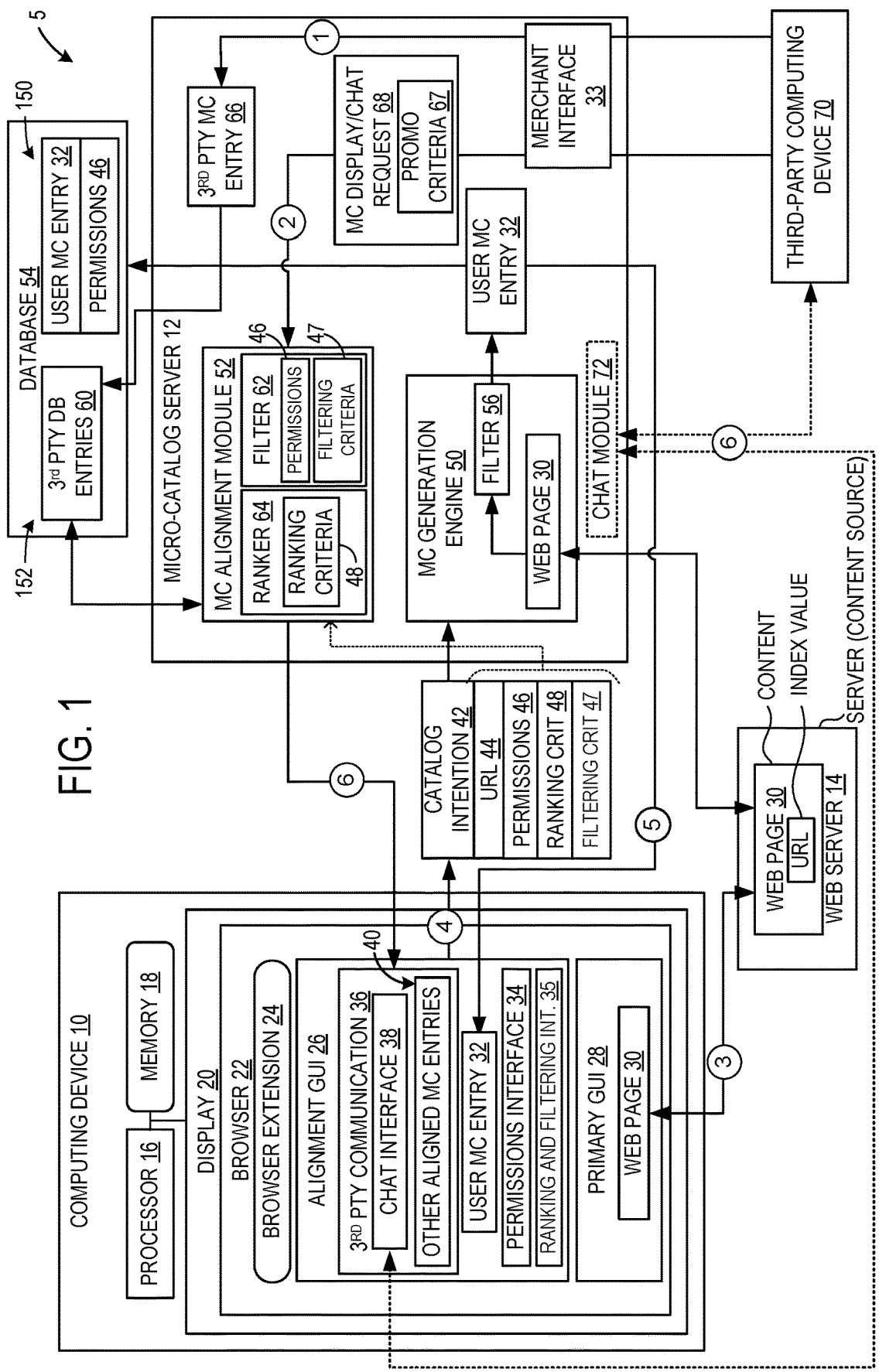
FIG. 1 shows a schematic diagram of a computerized anonymous permissions-based communication system according to one embodiment of the present disclosure.

FIG. 1 illustrates a computerized permission-based communications system 5 according to one aspect of the present disclosure, which includes a computing device 10, a micro-catalog server 12, a server 14 that functions as a content source for network addressable content, and a third-party computing device 70 used by a third party such as a merchant. The computing device 10 may be implemented as a desktop computer, laptop computer, tablet, or smartphone, for example. The computing device 10, the micro-catalog server 12, and the server 14 may be configured to communicate with one another via a wide area network, such as the Internet. In one implementation, the server may be configured as a web server 14, and may alternatively be referred to as such herein.

The computing device 10 may include a processor 16, memory 18, and a display 20. The processor 16 may be configured to display a primary graphical user interface (GUI) 28 and an alignment GUI 26 in one or more instances of a browser 22 on the display 20 of the computing device 10. The browser 22 may be a stand-alone browser application or an embedded browser application that functions as part of a different application program (i.e., an in-app browser), for example. The primary GUI 28 is configured to display network-addressable content such as a web page 30 downloaded from a server, such as web server 14, for example, as the user browses the Internet. The network-addressable content may be located at a network address, such a URL, which serves as an index value for indexing the network addressable content, as described below. The browser 22 may be customized via a browser extension 24 to display the alignment GUI 26 in the same or another browser instance on the display 20 of the computing device 10. The alignment GUI 26 is populated with content served by the micro-catalog server 12. As described below, the content served by the micro-catalog server 12 to the alignment GUI 26 may be aligned to a URL 44 of the web page 30. It will be understood that in the examples discussed throughout the subject application the server is described as a web server 14, the network addressable content is described as a web page 30, and the index value is described as a URL for illustrative purposes. Alternatively, it will be appreciated that the server may be an intranet server, the content may be a file stored on the intranet, and the index value may be an intranet address. As yet another alternative, the server may be an application server, the content may be in-app content, and the index value may be an in-app address used by the application program to access content from a database or file server, for example.

Initially, the various users of micro-catalog server 12, including the user of computing device 10, users of third-party computing devices 70 such as merchants, and other users register with the micro-catalog server 12. The registration process is further described below for both users and merchants with reference to FIGS. 5, 6, and 8.

Figure 7A:
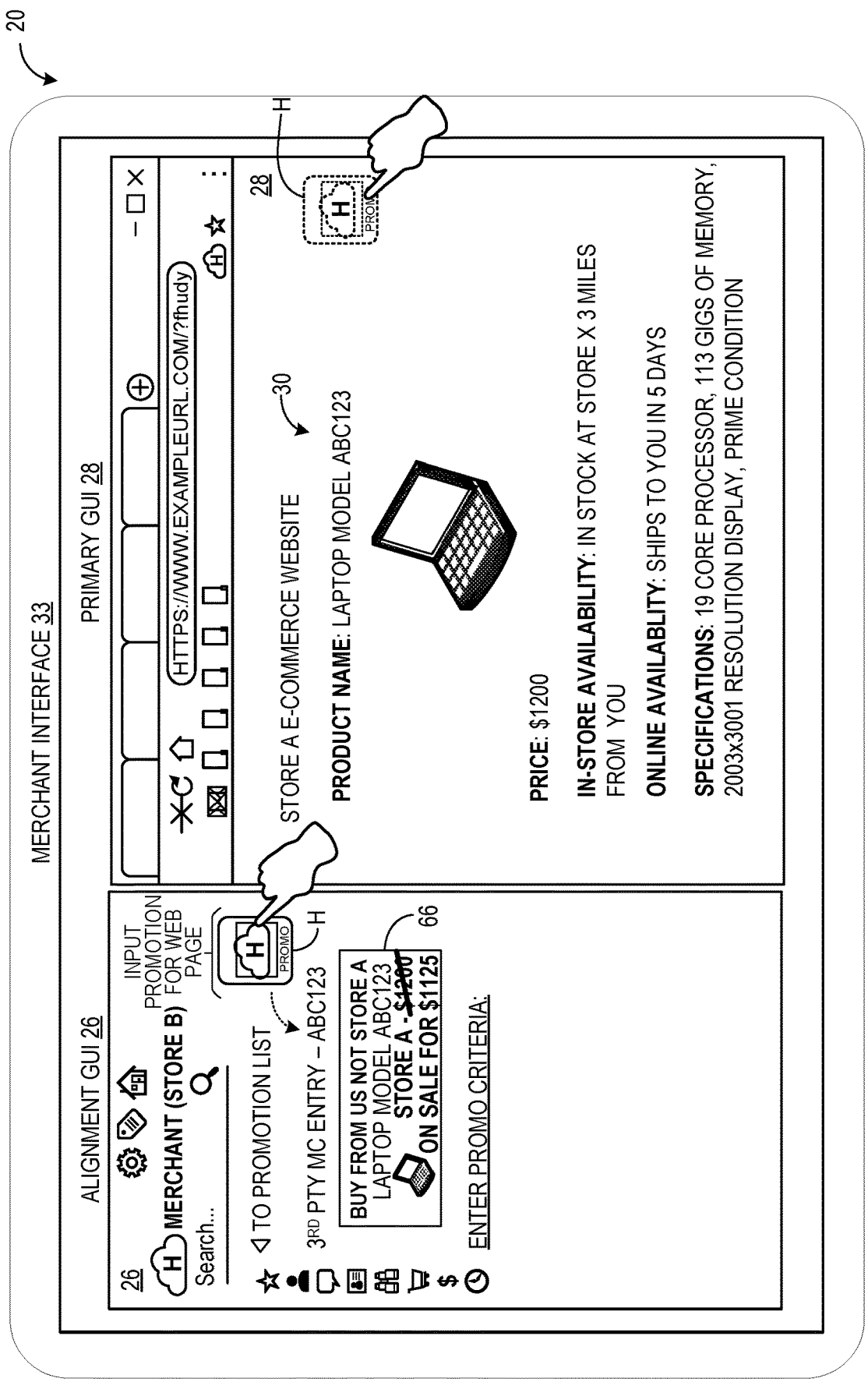
FIGS. 7A and 7B shows a merchant interface including a promotions interface by which a merchant may enter a promotion, according to the system of FIG. 1.

Following registration, a process flow generally proceeding from (1) to (6) as illustrated in FIG. 1 is followed. At (1), a third party such as a merchant may initiate an action to create a third-party micro-catalog entry 66 for content on the Internet, such as web page 30, via a merchant interface 33 of the micro-catalog server. Detailed actions for generating the third-party micro-catalog entry 66 are similar to that for generating user micro-catalog entry 32, and are illustrated in FIG. 7A. The third-party micro-catalog entry 66 may be stored as a third-party database entry 60 utilizing a third-party micro-catalog database structure 152 in database 54.

Figure 7B:
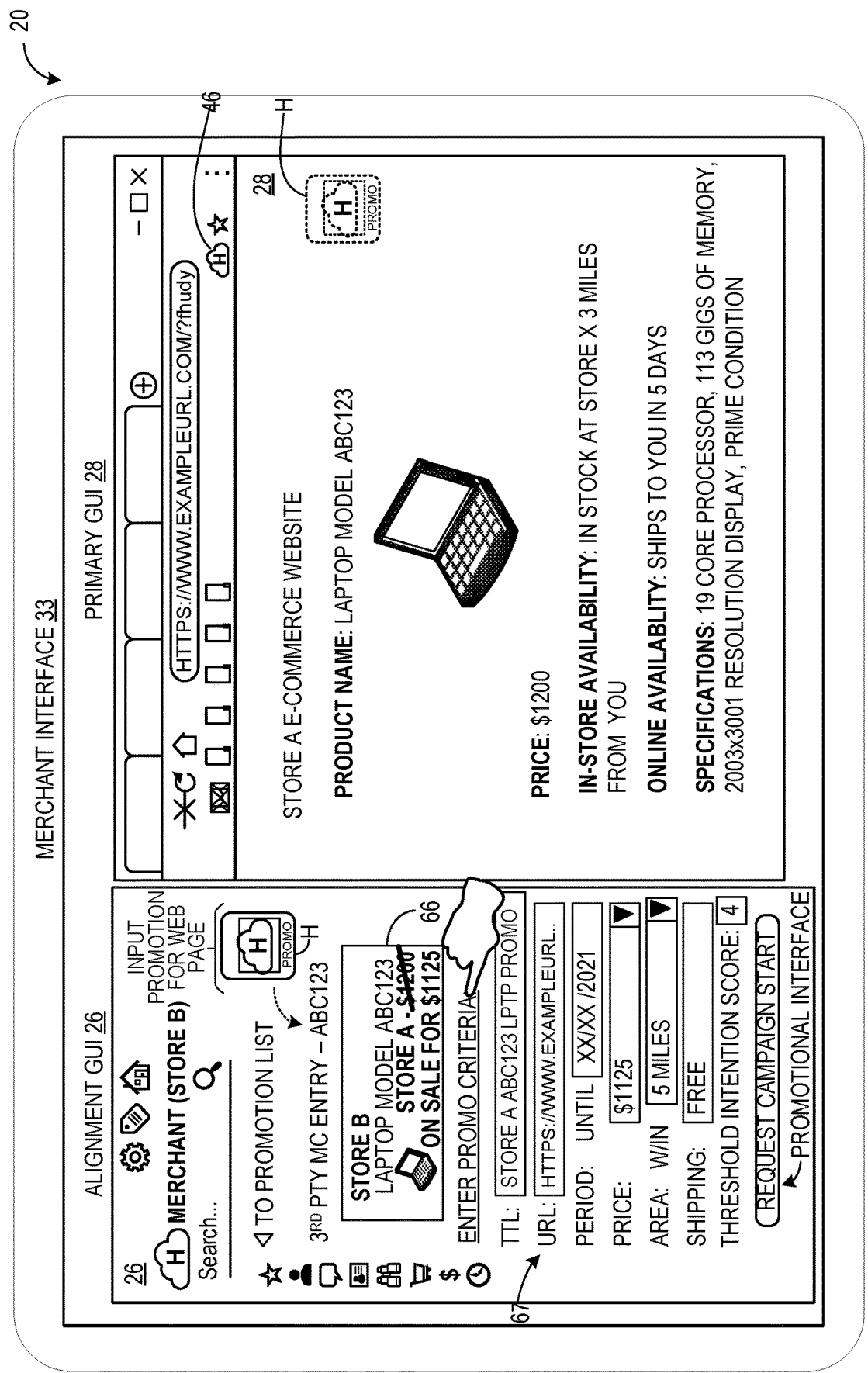
Figure 9A:
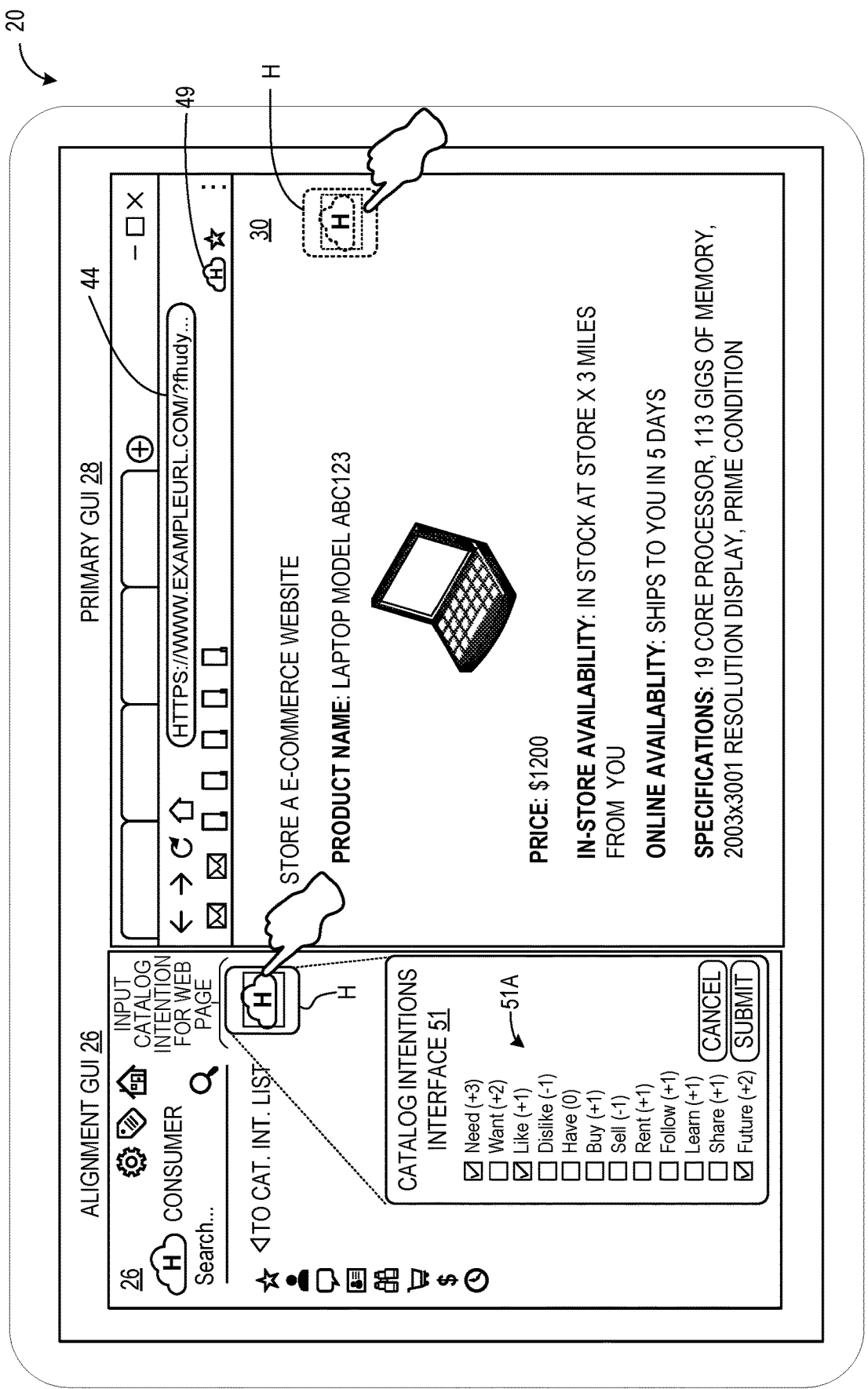

At (2), the third party may generate a request 68 for a third-party communication 36 to be displayed to users of the system 5, via the merchant interface 33 of the micro-catalog server 12. Typically, this is accomplished by the third party establishing a communications campaign at the micro-catalog server 12. In a communications campaign the third party establishes promotional criteria 67 according to which the micro-catalog server 12 attempts to display a designated third-party communication to the user. The third-party micro-catalog entry 66 may be used as the third-party communication, as shown in FIG. 7A. Alternatively, a chat module 72 may be employed and the third-party communication may be a chat interface 38, an example of which is illustrated in FIG. 9I. A merchant interface including a promotions interface that may be used to input such campaign parameters is illustrated in FIG. 7B.

At (3), in the course of the user browsing the Internet, a user downloads a web page 30 from web server 14, which is displayed in a primary GUI 28 of browser 22 on computing device 10. Thus, the processor 16 may be configured to display a web page 30 in the primary GUI 28 of the browser 22, which has been served by web server 14. The browser extension 24 may be configured to selectively display the alignment GUI 26 concurrently with the primary GUI 28, based on a command from the user. The alignment GUI 26 is a private-facing graphical user interface that displays information from micro-catalog server 12 to the user, when the user is logged in to the micro-catalog server 12. As shown, the displayed information may include user micro-catalog entries 32, which are generated in response to user input of a catalog intention 42. Micro-catalog entry 32 may be correlated to web pages featuring products, services, information, people, and the like viewable on the Internet. Thus, each micro-catalog entry 32 may include an associated a URL 44 of the corresponding web page 30, which permits a user to navigate to the source (i.e., web page 30) of the micro-catalog entry 32. Since micro-catalog entries 32 contain the same URL as the web page 30 are said to be aligned to the web page 30 by that URL. The micro-catalog entry contains the URL as stored metadata for indexing purposes, whereas the web page 30 is accessible (i.e., addressable) at the URL.

Figure 3:
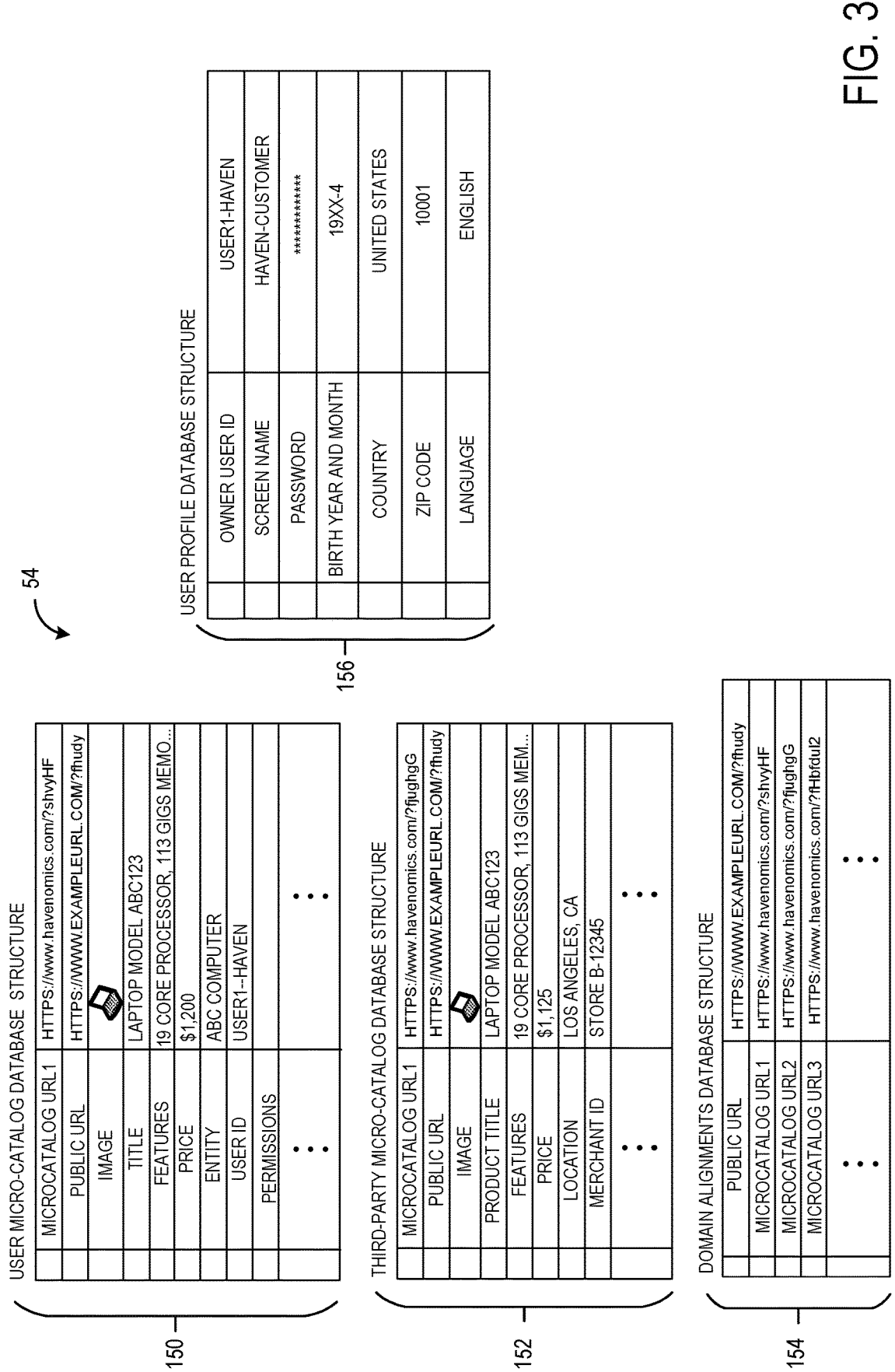
FIG. 3 shows a schematic illustration of various database data structures utilized by the system of FIG. 1.

Database structures enabling the micro-catalog server 12 to display micro-catalog entries 32 that are associated with a same URL are illustrated in FIG. 3, described below and stored in database 54. It will be appreciated that the web server 14 is an example of a content source, the web page 30 is an example of content, and the URL is an example of an index value that may be used for aligning the user micro-catalog entry 32 to other aligned micro-catalog entries 40.

It will be appreciated that other types of index values may be used in addition or alternatively to URLs, such as globally unique identifiers (GUIDs), geo-locations as expressed in latitude and longitude coordinates, scannable codes such as bar codes and QR codes, phone numbers, email addresses, television, radio, and various types of publications and printed materials. These other index values may be included as such metadata in other fields of the micro-catalog entry 32. Further, it will be appreciated that types of content other than a web page 30 from sources other than a web server 14 may be cataloged by the micro-catalog server 12. For example, radio and television broadcasts sent from a transmitter or over the Internet may carry a unique program code as the index value embedded in the broadcast signal, streaming media narrowcast over the Internet may carry associated program code embedded in the media stream, and printed material such as a publication or menu may carry an index value embedded in a QR code. Micro-catalog entries 32 may also be exclusively aligned to a top-level domain by merchants for a period of time and/or days for a surcharge. This allows a merchant to exclusively promote certain micro-catalog entries 32 to specific audiences and/or demographics.

Each micro-catalog entry 32 may be configured to display information such as a photograph, description, price, and metadata, for example, that is associated with the content. This information is programmatically ingested from web page 30, or other content type as the case may be, by the micro-catalog generation engine 50 during generation of the micro-catalog entry 32, as discussed below.

At (4), the processor 16 of the computing device 10 may be configured to receive, via the alignment GUI 26, a user input indicating a catalog intention 42 for the displayed web page 30 in the primary GUI 28. When the user input is received, the catalog intention 42 is transmitted to the micro-catalog server 12 to cause the micro-catalog server 12 to create a user micro-catalog entry 32 for content at the web page 30 via a selective filter 56 of a micro-catalog generation engine 50, and store the user micro-catalog entry 32 in a user micro-catalog database structure 150 hosted in database 54. It will be appreciated that the filter 56 is programmed to select a subset of the web page data, such as a subset of text data, one or more images, and/or metadata associated with the web page, for inclusion in the user micro-catalog entry 32, and filter out the remaining web page data. Further, the processor 16 of the computing device 10 may be configured to receive from the user, via the alignment GUI 26, user inputted permissions 46 associated with the user micro-catalog entry 32 through a permissions interface 34 served by the micro-catalog server 12. The permissions 46 include a plurality of user-input parameters defining permissible third-party communications associated with the user micro-catalog entry 32, as further described below. The permissible third-party communications may include bi-directional messaging via the third-party chat interface 38, an example of which is illustrated in FIG. 9I.

Turning briefly to FIG. 9D, the permissions interface 34 served by the micro-catalog serer 12 includes one or more permission selectors 180 that are configured to receive one of the user-input parameters defining the permissions 46 associated with the user micro-catalog entry 32. The permission selectors 180 may include a third-party type permission selector 182 configured to receive user input of a third-party type including merchants, other users, and advisors. The permission selectors 180 may include a communication type permission selector 184 configured to receive user input of a communication type including information and updates, and promotion and offers. The permission selectors 180 may further include a time period permission selector 186 configured to receive user input of a time period including indefinite, one-day, one week, and custom. The permission selectors 180 may further include a communication mode permission selector 188 configured to receive user input of a communication mode including messaging, voice and display of micro-catalogs in the user's aligned micro-catalogs. The permission selectors 180 may further include a communication content permission selector 190 configured to receive user input of a communication content type including exact product/service, similar product/service, products/services frequently purchased together, lower cost products/services only, faster delivery products/services only, and geographic proximity.

Turning briefly to FIG. 3, the user micro-catalog entry 32 may be indexed at the micro-catalog server 12 by the URL 44 of the web page 30 in the database 54. The user micro-catalog entry 32 recorded in the user micro-catalog database structure 150 of the micro-catalog server 12 includes a programmatically selected subset of text data, one or more images, and/or metadata associated with the web page 30, which has been selected by filter 56 as described above. The metadata for the user micro-catalog entry 32 includes a title of the web page 30, a price of a good or service offered on the web page 30, and/or a geographical location an entity featured on the web page 30. The user micro-catalog entry 32 may further include a public URL for the web page 30, a micro-catalog URL for the user micro-catalog entry 32, a user ID for the user, and/or the permissions 46 for the user micro-catalog entry 32. Similarly, the micro-catalog server 12 may store a third-party (e.g., merchant) micro-catalog database structure 152 populated by data received from a merchant for the third-party micro-catalog entry 66. The merchant micro-catalog database structure 152 may include a public URL for the web page 30 cataloged by the merchant, images, product title, a price of the product, location of the product, and merchant ID. The merchant may also add other data including information on its own products, promotional campaign parameters, price information, etc. In this way, the merchant can use the third-party micro-catalog entry 66 as in a promotional manner to be displayed in the alignment GUI 26 according to campaign parameters discussed below. The micro-catalog server 12 may further store domain alignments information, which associate the public URL with aligned micro-cataloged URLs, in a domain alignments database structure 154. It will be appreciated that the domain alignments database structure is referenced to look up determine other aligned micro-catalog entries 40 to be served from micro-catalog server 12 to the computing device 10 for display in the alignment GUI 26. Database 54 also includes a user profile database structure 156 for storing information about the user. A third-party profile database structure (not shown) may also be provided, and may contain similar information regarding each merchant, including identifying information for the merchant, and information regarding current promotional campaigns of the merchant, etc.

Turning back to FIG. 1, as shown at (5), the processor 16 of the computing device 10 may be configured to display the user micro-catalog entry 32 selected by a user in the alignment GUI 26. Further multiple user micro-catalog entries 32 may be displayed from among the user's entire collection of such entries, and the displayed results may be filtered by user-defined categories, such as subject matter, date range, user ranking (5 star, 4 star, etc.), location, cost, and the like. The display of the user micro-catalog entry 32 may occur either prior to input of permissions 46 and/or ranking criteria 48 via a ranking and filtering interface 35, contemporaneously therewith, or thereafter.

As shown at (6), the processor 16 of the computing device 10 may be configured to present, via the alignment GUI 26, one or more third-party communications 36 that are authorized by the permissions 46, such as other aligned micro-catalog entries 40 and/or chat message via a third-party chat interface 38. As described at (2) above, the micro-catalog server 12 is configured to receive a third-party request 68 from a registered third party, such as a merchant, to display a third-party micro-catalog entry 66 and/or a third-party chat interface 38 in a candidate alignment GUI 26 of the computing device 10 and indexed according to the URL for the user micro-catalog entry 32. Subsequently, at (6), the micro-catalog server 12 is configured to determine whether the third-party request 68 satisfies the user inputted permissions 46 for the micro-catalog entry 32, and if so, cause the computing device 10 to display third-party micro-catalog entry 66 or chat interface 38 in the alignment GUI 26 of the computing device 10, else refrain from causing the computing device 10 to display the third-party micro-catalog entry 66 or third-party chat interface 38 in the alignment GUI 26 of the computing device 10.

The processor 16 of the computing device 10 may be configured to display other aligned micro-catalog entries 40 associated with the respective user micro-catalog entry 32 in the alignment GUI 26, typically in filtered manner with a ranked order. Typically, the alignment functionality is implemented by a micro-catalog alignment module 52, which executes a filter 62 and a ranker 64 that function to filter and rank the aligned micro-catalog entries of third parties and other users within the alignment GUI 26 according to ranking criteria 48 and filtering criteria 47 entered via ranking and filtering interface 35, as illustrated in FIGS. 9A-9I. It will be appreciated that the micro-catalog alignment module 52 receives the URL 44, permissions 46, and ranking criteria 48 and filtering criteria 47, from the user input in order to implement this functionality. As examples of filtering criteria 47, the other aligned micro-catalog entries 40 may be filtered by user-defined categories, such as subject matter, date, user ranking, location, cost, and the like. In addition, the user may choose to filter such that only micro-catalog entries of third parties that meet permissions 46 are displayed. Additional filtering criteria are illustrated in FIG. 9G. Further, the ranker 64 is configured to rank the filtered micro-catalog entries by ranking criteria 48 such as are shown in FIG. 9G, and cause the micro-catalog generation module to command the alignment GUI 26 to display the aligned third-party micro-catalogs in a ranked order defined by the ranker 64.

System 5 is configured to enable a third-party to send a chat message to the user computing device 10 via a chat module 72 of the micro-catalog server 12. The chat module 72 communicates with a chat client (not shown) on the third-party computing device 70 and with chat interface 38. The chat message from the third party to the user is displayed as a third-party communication 36 in the chat interface 38 in the alignment GUI 26. Importantly, the third party is not informed as to the identity of the user when sending this message or receiving a reply. The micro-catalog server 12 preserves the anonymity of the user by anonymously brokering message communication between the third-party computing device 70 and the user computing device 10. An example of such a chat interface 38 is illustrated in FIG. 9I, discussed below.

While one third-party computing device is shown for illustrative purposes in FIG. 1, it will be appreciated that the system 5 may be used with multiple third parties, each conducting its own promotional campaign utilizing the system. Thus, the micro-catalog server 12 is configured to receive multiple third-party requests 68 to create multiple third-party micro-catalog entries or third-party chat interface instances that are indexed by the URL of the web page 30, and the presented third-party communication is a target third-party micro-catalog entry or a target third-party chat interface instance among the multiple third-party micro-catalog entries or third-party chat interface instances. When there are multiple third-party requests 68 that satisfy the user inputted permissions 46 for the micro-catalog entry 32, the micro-catalog server 12 is configured to filter the multiple third-party micro-catalog entries or third-party chat interface instances based upon the permissions 46 entered via the permissions interface 34 and also based on the filtering criteria 47 entered by the filtering selectors 222 of the ranking and filtering interface 35 to thereby generate a set of filtered third-party micro-catalog entries or third-party chat interface instances. The filtering criteria may include inclusion and/or exclusion of specific merchants and/or categories of goods, for example. Turning briefly to FIG. 9G, the micro-catalog server 12 is configured to rank the filtered micro-catalog entries or third-party chat interface instances according to a ranking criteria 48 entered via ranking selectors 220 of ranking and filtering criteria interface 35, to thereby display a ranked list of filtered third-party micro-catalogs entries or third-party chat interface instances that are indexed by the URL in the alignment GUI 26, where the displayed ranked list includes the target third-party micro-catalog entry or target third-party chat interface instance. The ranking criteria 220 selected by the user may include price, delivery of speed, review scores, size of vendor, and geographic proximity.

Figure 2:
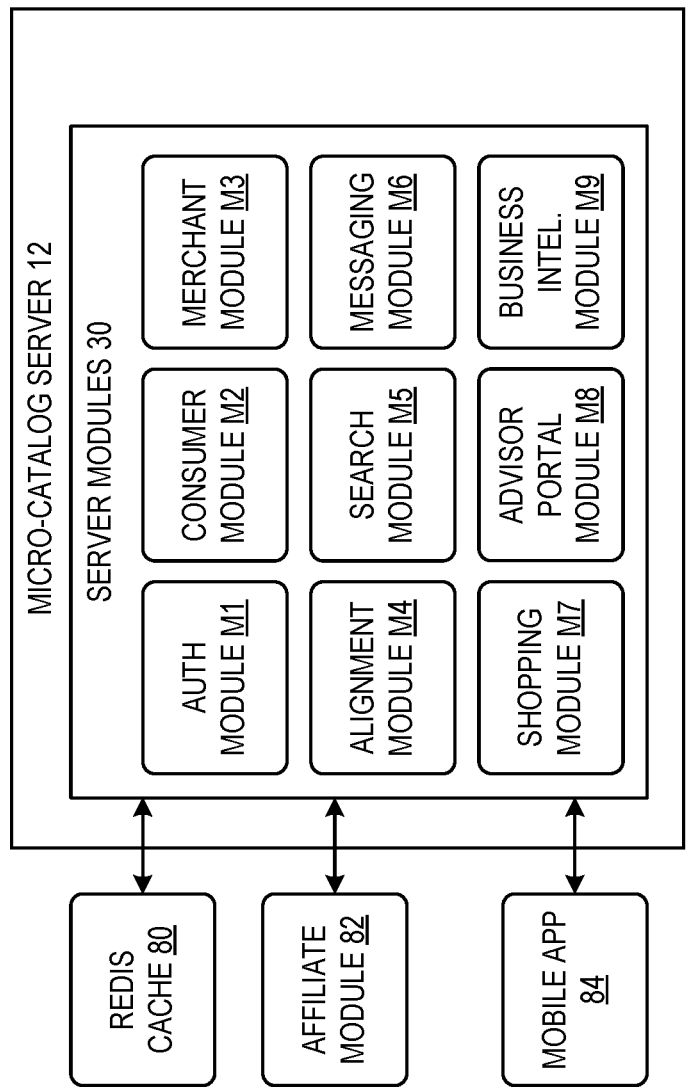
FIG. 2 shows a schematic diagram of exemplary server modules that may be executed by the system of FIG. 1.

Turning to FIG. 2, the micro-catalog server 12 may include server modules 30 in communication with the computing device 10, and the web server 14. The server modules 30 include a cluster of modules that determine what is presented in the alignment GUI 26 and the primary GUI 28. For example, an authentication module M1 may store instructions for launching a login window such as the new user registration page of FIG. 8 for registering new users, and for collecting user information to verify that a user is registered with the browser extension 24. A consumer module M2 may provide an anonymous platform for a user to search for products or services offered by merchants, present their intentions to potential merchants, and select micro-catalogs of interest as intentions. It will be appreciated that the user is alternatively referred to herein as a consumer at times to emphasize the user's role as a consumer when interacting with merchant communications. The consumer module may implement the GUIs shown in FIGS. 9A-9I, 10A-10D. A merchant module M3 may provide a public-facing platform for a merchant to present products, services, and/or information that they offer or sell, to align their product, services, and/or information with desired web addresses, and to market themselves. The merchant interface shown in FIGS. 7A-7B may be implemented by the merchant module M3. Operations related to the organization, filtering, and presentation of micro-catalogs and intentions may be stored in the alignment module M4. A search module M5 provides functionality for collecting and presenting resources found on the Internet in response to a search request input by a user. The search interface of FIG. 12 may be implemented by search module M5. Consumers and merchants may securely communicate with one another via the messaging module M6, which implements chat interface 38 described above. The shopping module M7 may allow transactions between a consumer and a merchant. Advisor portal module M8 may be configured to manage data related to the portals associated with the browser extension, and may implement the GUI of FIG. 11, for example. It will be appreciated that advisor portals and merchant portals have common features to augment and enhance anonymous micro-catalogs. Some of these features include: FAQs, anonymous-profiles (intention questionnaires fill-out by consumers), timelines (time-stamped intentions with relational connections), merchant-bidding (merchant queue up to out-bid one another for consumers' intentions), comparisons (micro-catalog entries are compared side-by-side), clustering (categorizing micro-catalog entries by topic or genre), and searching by demographics, global-profiles (portal profile that is communicated to all soliciting merchants), to name few. Verifiable transactions between consumers and merchants may be managed and stored via the business intelligence module M9. A mobile application program 84 in communication with the web server 14 may be configured to utilize data from modules in the server modules 30 to determine what is displayed in the primary GUI 28 via the web server 14 for consumption by module computing devices used by the user. It will be appreciated that the functionality of each module as described above serves to provide an example of the capability of each module, and in not intended to limit the modules to only the exemplary tasks.

The micro-catalog server 12 may further include an application cache, such as a Redis cache 80, to store data, such as URLs associated with micro-catalogs and/or alignment indexes, for the browser extension 24, thereby reducing latency and accelerating response time when a request is received. These Redis cache 80 may be populated using data from database 54, an in particular from domain alignment database structure 154. An affiliate module 82 on the micro-catalog server 12 allows for the creation and management of affiliate relationships. Consumers who desire to become an affiliate can register without linking their anonymous consumer profile with their public affiliate profile.

Figure 4A:
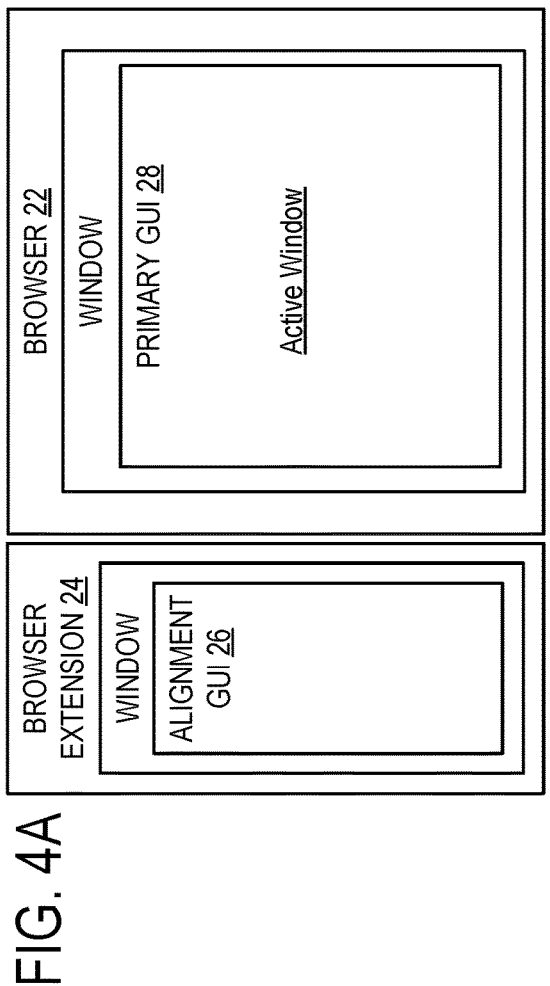
FIGS. 4A-4C illustrate three different examples of the display of a primary GUI and alignment GUI of the system of FIG. 1, namely, displayed in a browser window and browser extension window (FIG. 4A), displayed in a browser window and a separate iFrame within the browser window (FIG. 4B), and displayed in a main pane and an auxiliary pane of a browser window (FIG. 4C).
Figure 4C:
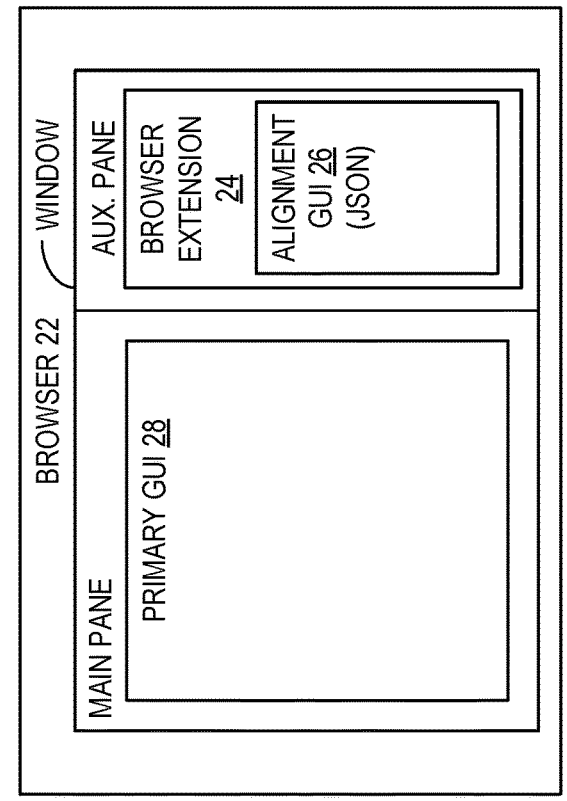
Figure 4B:
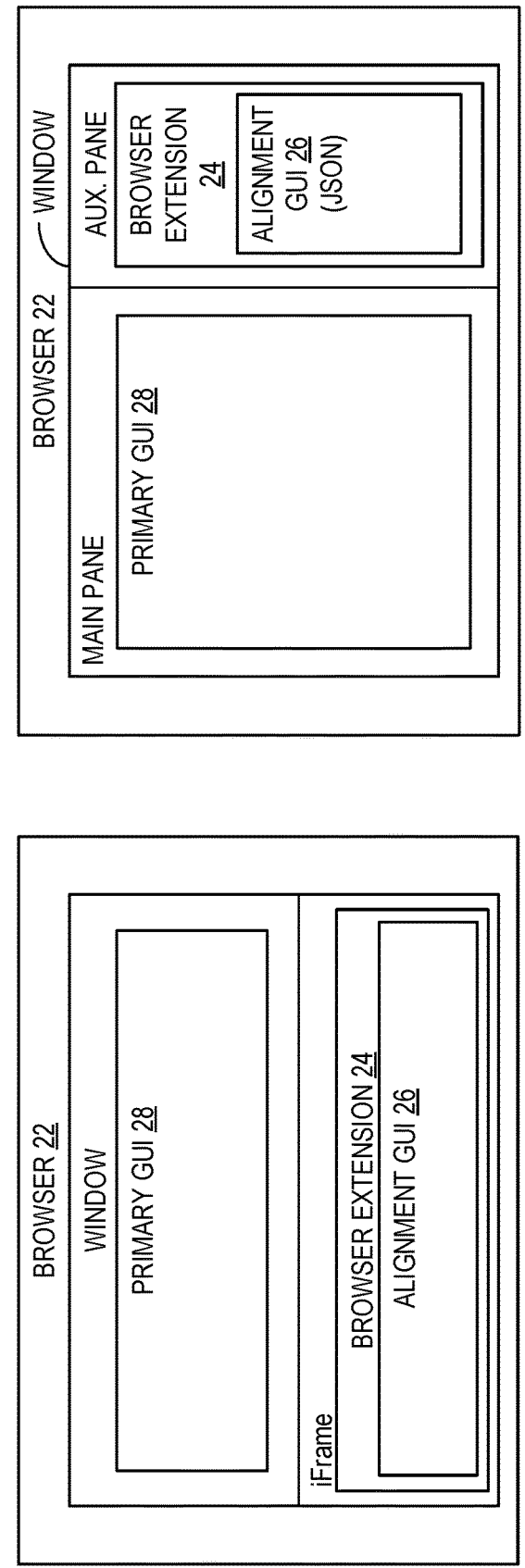

Turning to FIGS. 4A, 4B, and 4C, it will be appreciated that the primary GUI 28 and the alignment GUI 26 may be displayed as separate windows or in the same window. In a first configuration shown in FIG. 4A, the browser extension 24 may be executed in a separate window, and the alignment GUI 26 may be displayed in that separate window. This separate window may be attached or detached to an active window that displays the primary GUI 28. In a second configuration shown in FIG. 4B, the browser extension 24 may be executed in an iFrame so that the alignment GUI 26 may be displayed in the iframe within the same window as the primary GUI 28. Alternatively, in a third configuration shown in FIG. 4C, the browser extension 24 may be executed in an auxiliary pane, and the alignment GUI 26 may be displayed in the auxiliary pane within the same window as the primary GUI 28. When the primary GUI 28 is displayed in the same window of the browser 22 as the alignment GUI 26, as shown for example in FIGS. 4B and 4C, the contents of the primary GUI 28 and/or alignment GUI 26 may be received via an asynchronous transfer protocol, such as JavaScript Object Notation (JSON).

In some examples, the primary GUI 28 may be used to search for information that a user may wish to save as an intention, and may also display a public-facing selection of micro-catalogs that align with the user's search request. The user may select one or more micro-catalogs of interest to be displayed as intentions in their private alignment GUI 26.

Figure 5:
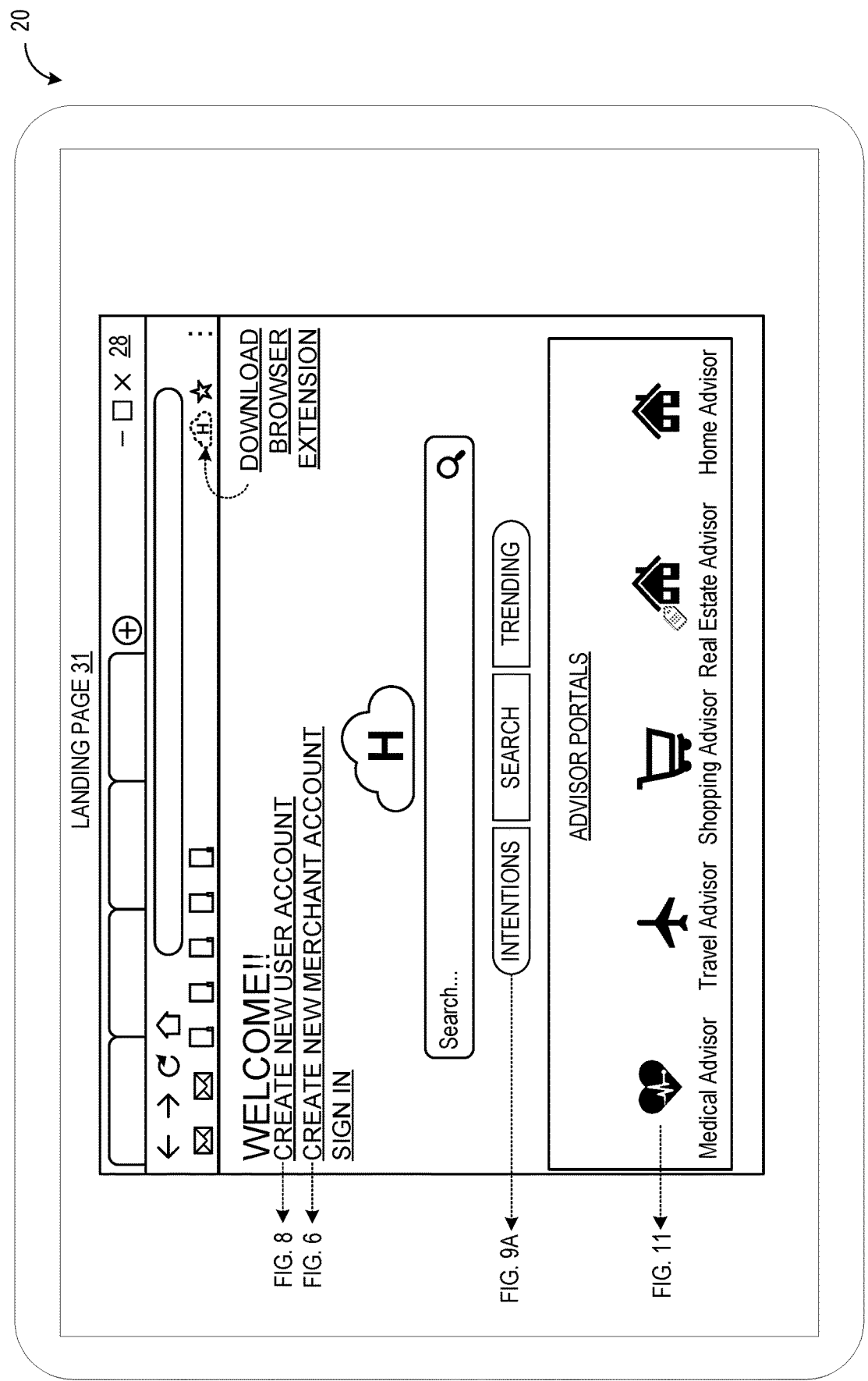
FIG. 5 shows a landing page of the system of FIG. 1.

As shown in FIG. 5, in the primary GUI 28, the user may also navigate to a landing page 31 of the micro-catalog server 12, which provides selectable advisor portals that contain resources regarding various popular topics such as medical, travel, shopping, real estate, and smart home systems. Selection of one of the presented topics may result in the display of information, as well as curated micro-catalogs associated with the displayed information, such as a specialized doctor or informational article that relates to a medical concern indicated by the user. The landing page 31 may also include links to create a new user account, create a new merchant account, sign in as an authorized user or merchant, and download the browser extension 24. Selection of each link causes the micro-catalog server to transition to other pages, as shown by dashed line references to other figures.

Figure 6:
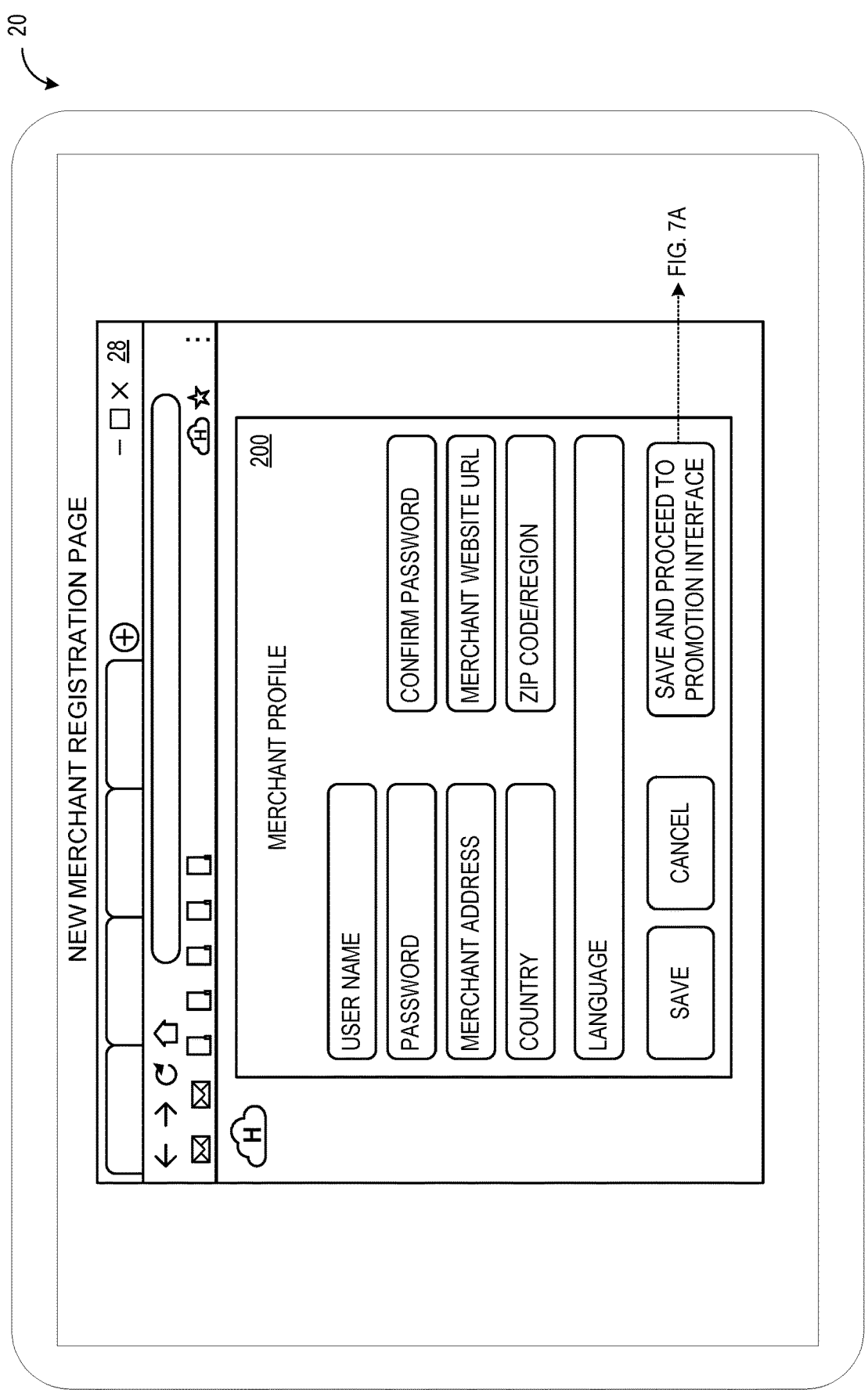
FIG. 6 shows a new merchant registration page of the system of FIG. 1.

FIG. 6 shows a new merchant registration page of the system of FIG. 1, which may be accessed by selecting create new merchant account hyperlink on the landing page of FIG. 5. The new merchant registration page is configured to display a merchant profile 200, including a plurality of fields for username, password, merchant address, merchant website URL, country, zip code/region, and language, which may be filled in by the merchant. Similar registration pages may be provided for other types of third parties, in addition to merchants. The fields provided are merely exemplary, and other data may be collected upon registration. A merchant may be an individual, organization, business owner, or the like that has one or more business entities that sell or offer products, services, and/or information. When a third-party desires to register with the browser extension 24 as a merchant, as shown in FIG. 6, they typically are required to provide identifying information that can be verified, such as a name, business name, government-issued identification, email address, physical address, phone number, and website address, as described above. In this way, merchants are identified to the administrator of the browser extension 24 and to consumers registered with the browser extension 24 and are thereby restricted from unwanted solicitation activities. It is important to note that merchants may have to verify account access using two-factor authentication when suspicious login activity is detected or before executing actions that may affect many consumers. Once the requisite information is entered by a new merchant, the merchant may create a micro-catalog entry 66 for a product or service they sell or offer, and align it with one or more search terms, web pages, and the like. The merchant may also select a selector to save and proceed to promotions interface in FIG. 7A, as shown.

FIGS. 7A and 7B shows a merchant interface including a promotions interface by which a merchant may enter a promotion. As shown in FIG. 7A, the merchants may choose to display their micro-catalog entries according to parameters such as a keyword or phrase, location, time frame, price point, and the like, for example, and may define a promotional campaign according to these goals. Merchants may also align one or more third-party micro-catalog entries 66 for a product or service to a QR code that may be shared with other users via a business card or flyer, for example. It should also be noted that every unique third-party micro-catalog entry 66 may be assigned a QR code. In such a case, the QR code becomes the index value to which the micro-catalog entries are aligned, as discussed above. When a consumer scans the QR code provided by the merchant, the merchant and their associated third-party micro-catalogs 66 are retrieved by the micro-catalog server 12 and may be saved as catalog intentions 42 by the consumer. When a user not registered with the browser extension 24 (or alternatively in other embodiments an application program such as a mobile application) scans a QR code provided by a merchant, they will be prompted to become a registered consumer. When the consumer adds the micro-catalog provided via a QR code on a merchant's business card as a catalog intention, it will be appreciated that the consumer remains anonymous and may choose to define if and/or how a merchant has permission to contact the consumer. In addition to QR codes, as described above, merchants can also choose to align micro-catalog entries 66 to forms of media such as television, radio, printed publications, and the like. For example, a merchant may desire to align a third-party micro-catalog entry 66 for a product or service they offer with a specific television program via a content source for the network. The alignment of the micro-catalog entry 66 may be in the form of, for example, a national channel code in a program guide and/or a channel code for a local affiliate. The merchant may further tailor the alignment of the third-party micro-catalog entry 66 based on parameters such as the date, time zone, or zip code in which the television program airs. Consumers may select an icon within the browser extension 24 and/or the application program (such as a mobile application) to view any other aligned micro-catalog entries 40 that are aligned with a specific television channel and/or program.

Furthermore, as shown in FIG. 7A, an example website 30 is shown in the primary GUI 28, and the merchant (in this case Store B) may select a catalog selector H to input a promotional campaign for the web page 30. The catalog selector H may be displayed in the alignment GUI 26 or in the web page 30, if the web page 30 includes a widget or code enabling this feature. This action causes the third-party micro-catalog entry 66 to be created for this web page 30. In the depicted example, the merchant (Store B) has modified the subset of data selected by filter 56 (including STORE A, LAPTOP MODEL ABC123, and a picture of the product) by adding the merchant's own price of $1125 within a message of "ON SALE FOR $1125" and by modifying "STORE A" to "BUY FROM US NOT STORE A" to the third-party micro-catalog entry 66.

FIG. 7B illustrates a promotional interface of the merchant interface 33. The promotional interface includes a plurality of input mechanisms (input fields, dropdown menus, etc.) by which the merchant may enter various promotional criteria 67 that define a campaign, including title, URL of web page to which the campaign will be aligned, period during which the campaign will be running, price, geographic area within which the campaign will run, shipping costs, and minimum intention score associated with a user's micro-catalog entry. The last category, explained below, enables merchants to only send requests for third-party communications with users who have inputted catalog intentions 42 that have an intention score that is above the merchant designated threshold intention score. In this way, merchants can ensure that a user's level of interest is high, and avoid sending requests to user's who are not sufficiently interested in particular content. Alternatively, instead of a fixed price, a relative price may be entered, and dynamically computed. For example, a discount of 10% from the price advertised in website 30 may be entered, as will be illustrated in FIG. 9H.

Figure 8:
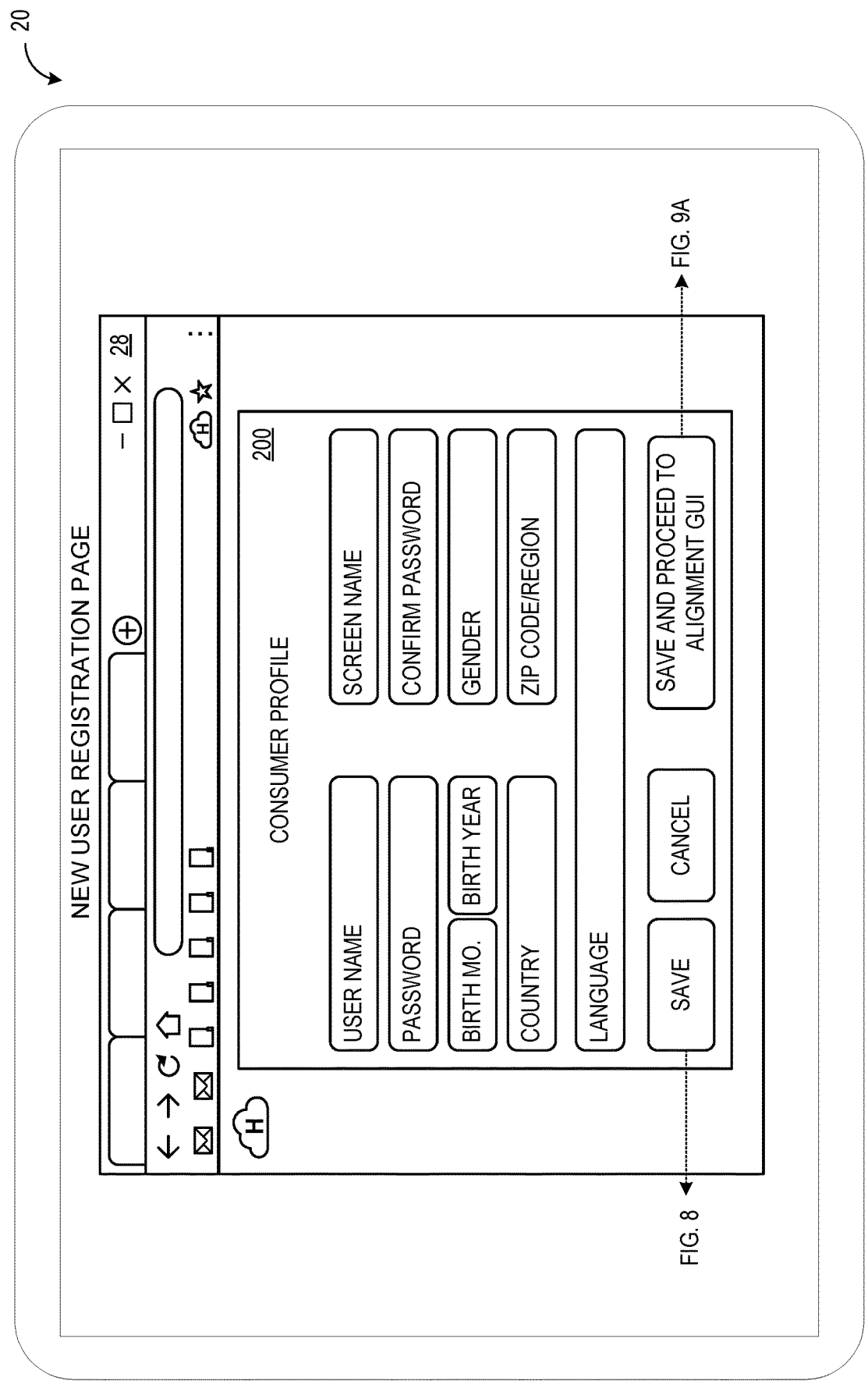
FIG. 8 shows a new user registration page of the system of FIG. 1.

FIG. 8 illustrates a new user registration page of micro-catalog server 12, which may be accessed from the link on the landing page of FIG. 5. Users may register as a consumer, which ensures a greater degree of anonymity than merchant registration. A key feature of the present disclosure is to provide a consumer with a secure platform for interacting with merchants over the Internet. As such, the consumer's identity is protected such that the consumer remains anonymous even to the administrators of the micro-catalog server 12. When a user desires to register with the browser extension 24 as a consumer, they complete a form presented in a new user registration interface 200 that is displayed in the primary GUI 28 on the display 20. The user selects a username, which is a unique alphanumeric name that will not be displayed (the user is instructed that this is a pseudonym). The screen name (the user is also instructed that this, too, is a pseudonym) is different from the username and will only be displayed to other consumers who register with the browser extension 24 and agree to become friends by way of an invitation link or by scanning a QR code. It should be noted that consumers can change their username and screen name as often as they want to ensure their anonymity. The user then enters and confirms a password, and provides their birth month and year, their gender (this data is optional), location (this data is optional), and language preference (default is English). The location is non-identifying information, as only the country and zip code or region are entered. The user may download and install the extension and begin by registering or alternatively they can register first then download and install the browser extension 24. Once the user enters the information and completes the registration process, the user profile database structure 156 is created and stored in the database 54 of the micro-catalog server 12 as shown in FIG. 3.

A key feature of the registration process lies in that identifying information such as a name, phone number, address, email address, or the like will not be requested from a user registering as a consumer. In the event that the user forgets or loses their password for the browser extension, it may be retrieved via security questions and/or downloadable backup codes. The anonymity of the system prevents merchants, social media sites, Internet hackers, and other users from collecting and sharing data about the consumer, thereby eliminating targeted advertising, unwanted solicitations, and associations with other users. Consumers who desire to become a merchant can register without linking their anonymous consumer profile with their public merchant profile.

Once the user is registered, the user may click SAVE to return to the landing page shown in FIG. 5, or may select SAVE AND PROCEED TO ALIGNMENT GUI to proceed to the alignment GUI 26 view shown in FIG. 9A. The landing page of FIG. 5 includes an INTENTIONS button, TRENDING button, and SEARCH button, as well as a search bar for entering a search query. The consumer may choose to perform activities such as view micro-catalogs entries that they have saved as catalog intentions 42 by selecting the INTENTIONS button, search for micro-catalog entries of others aligned with a search term that have been shared by merchants or other consumers, respectively, by selecting a SEARCH button, or view micro-catalog entries that are receiving a high level of attention from other registered users by selecting a TRENDING button, for example. The consumer may also search for a topic or website using the search bar. Performing a search function while running the browser extension 24 allows a consumer to create and share a public micro-catalog entry with other registered users, and/or to store search results of interest as catalog intentions, as discussed below with reference to FIGS. 9A to 9I and 10A-10D. As mentioned above, the landing page may also display selectable advisor portals for topics such as medical, travel, shopping, real estate, and smart home systems. As discussed below with reference to FIG. 11, selection of an advisor portal topic may allow a consumer search for a related sub-topic and to view curated micro-catalog entries associated with the sub-topic, such as a specialized doctor or informational article that relates to a medical concern indicated by the user.

Figure 9B:
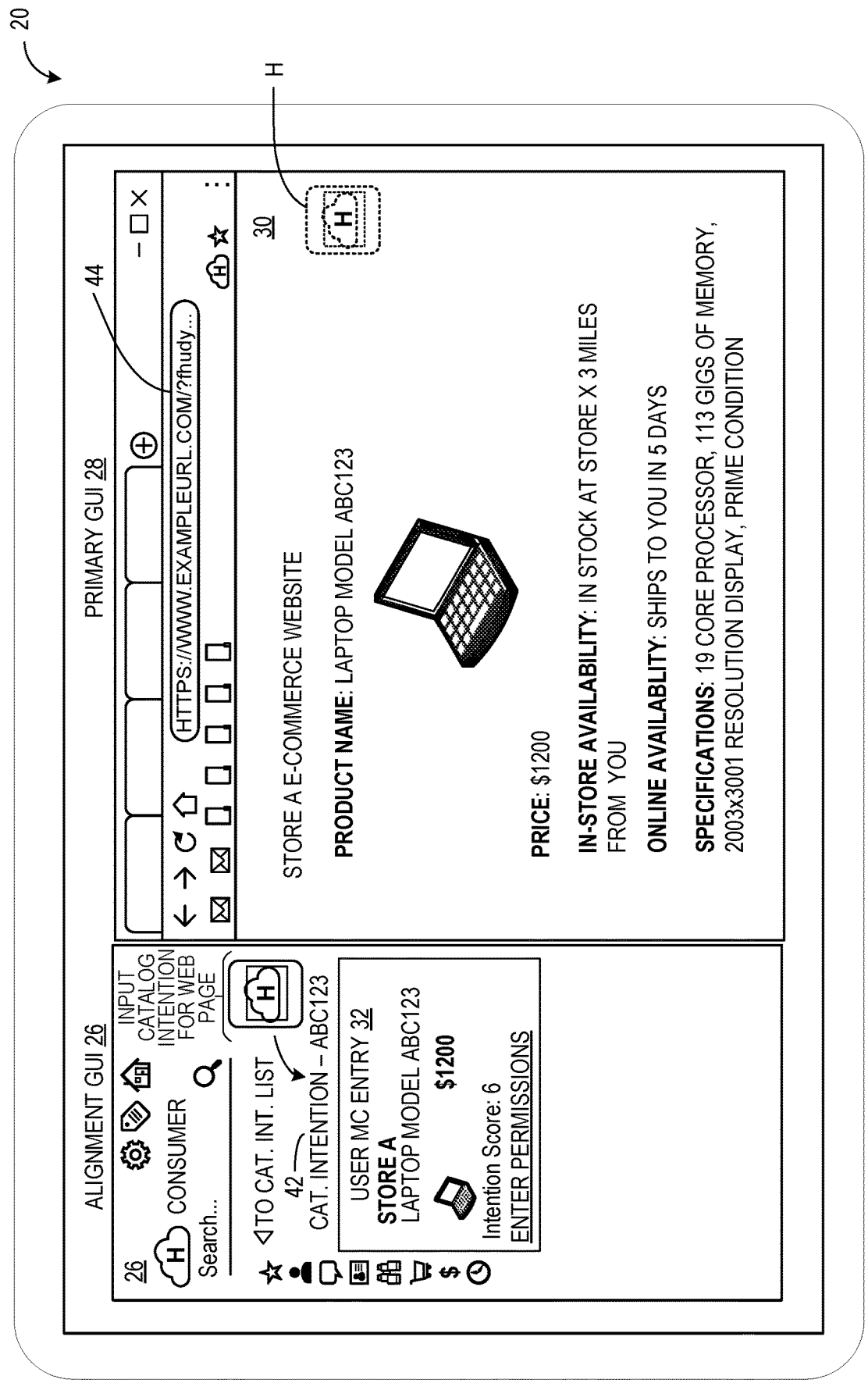
Figure 9C:
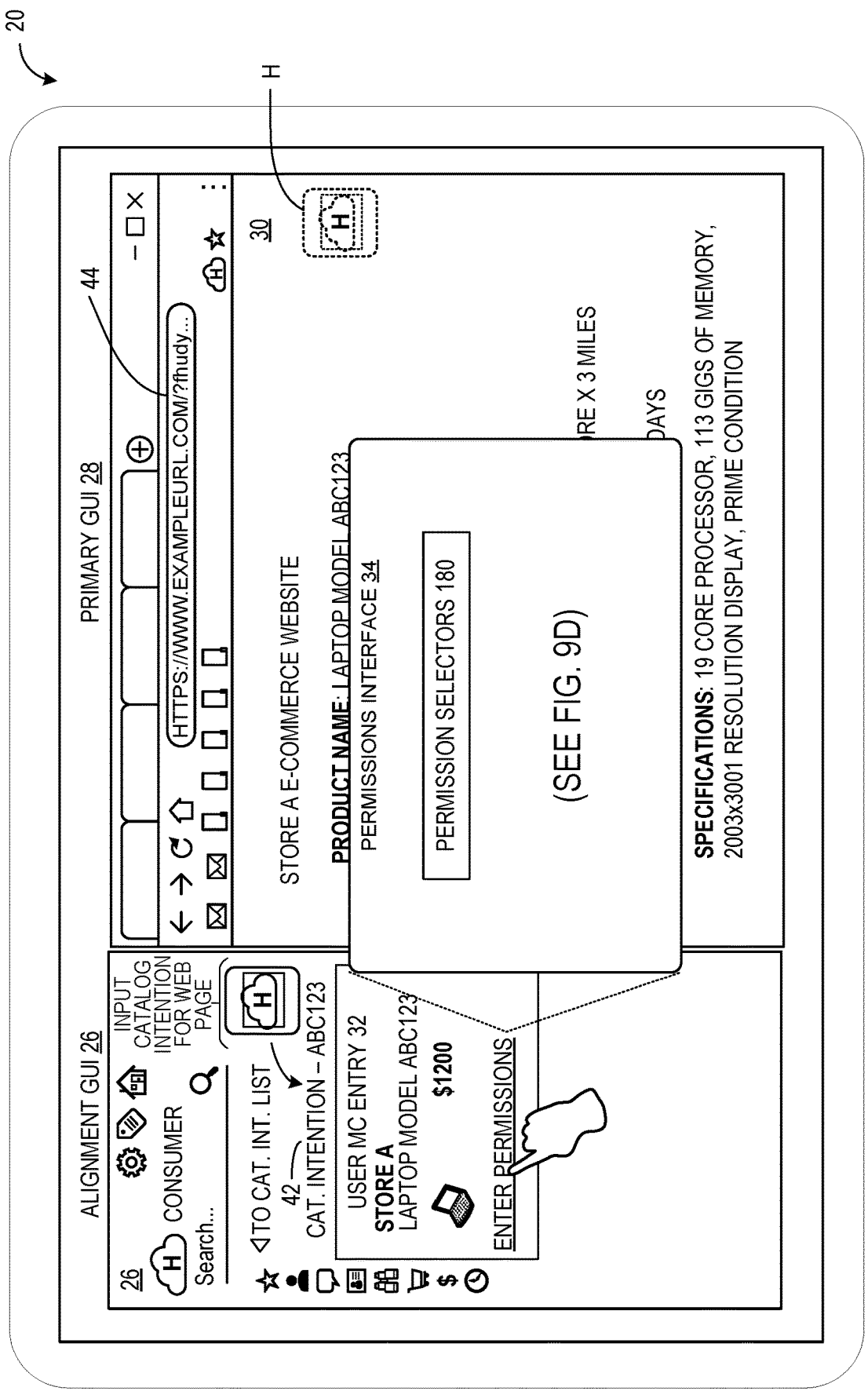
Figure 9E:
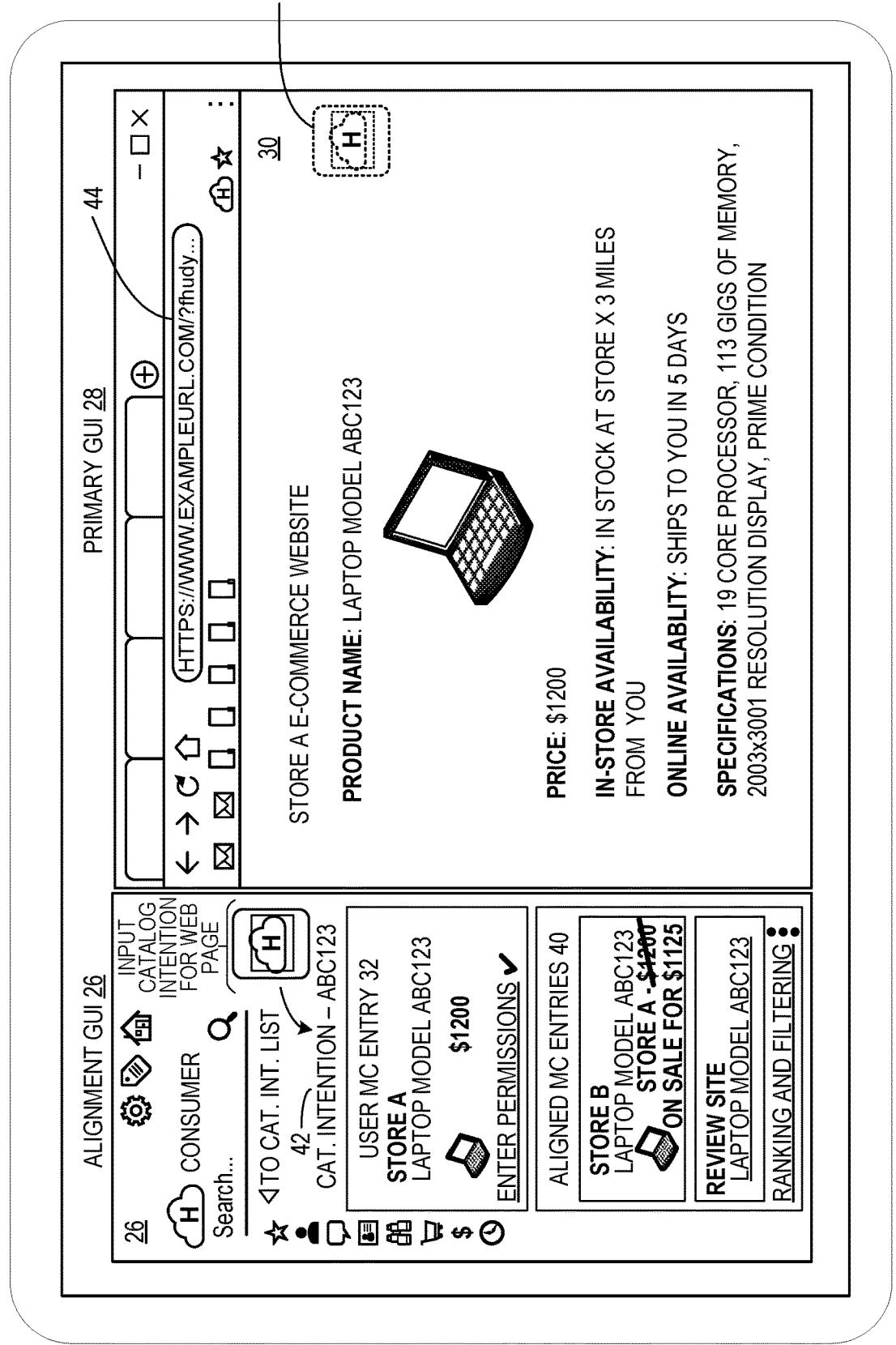
Figure 9F:
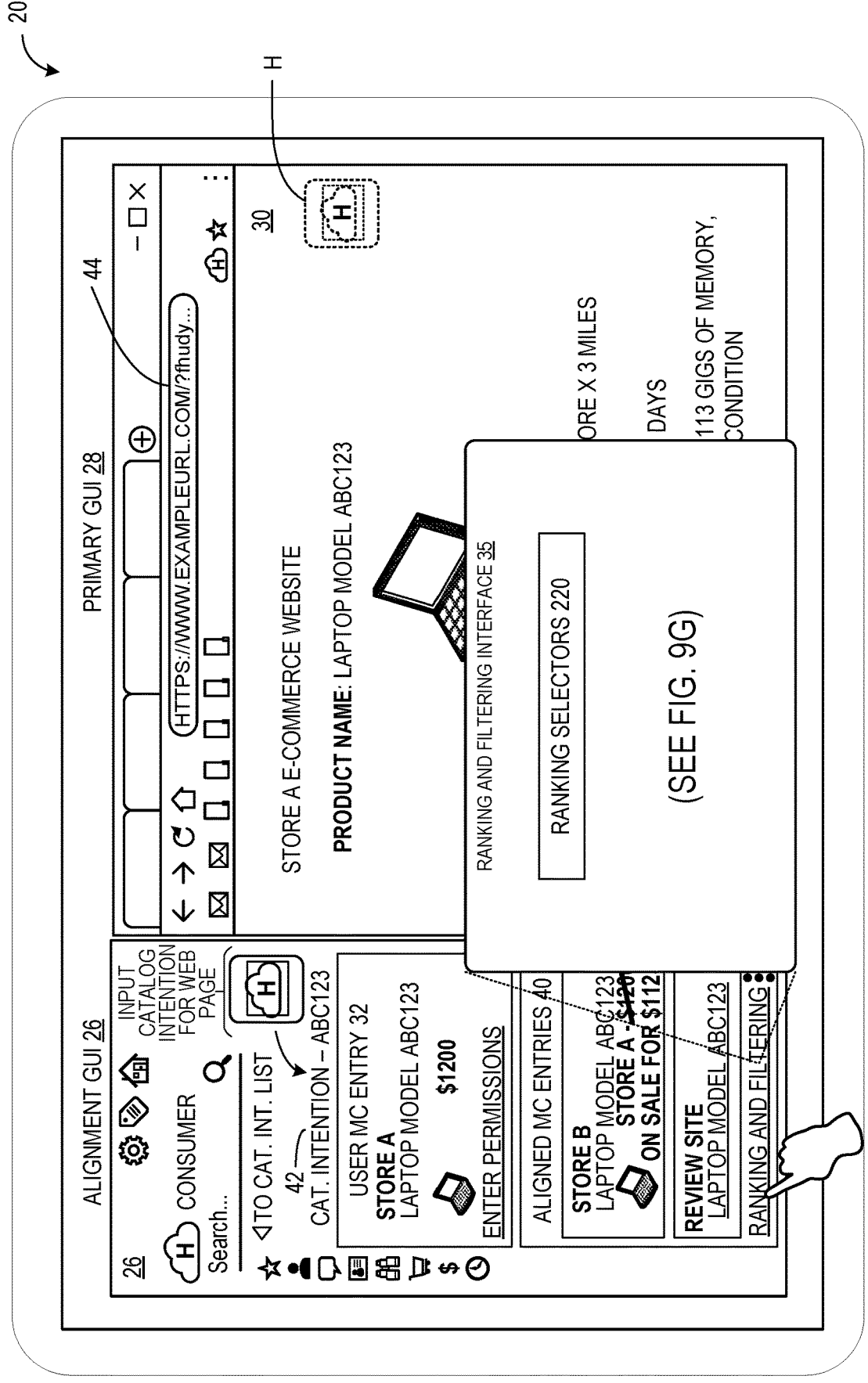
Figure 9H:
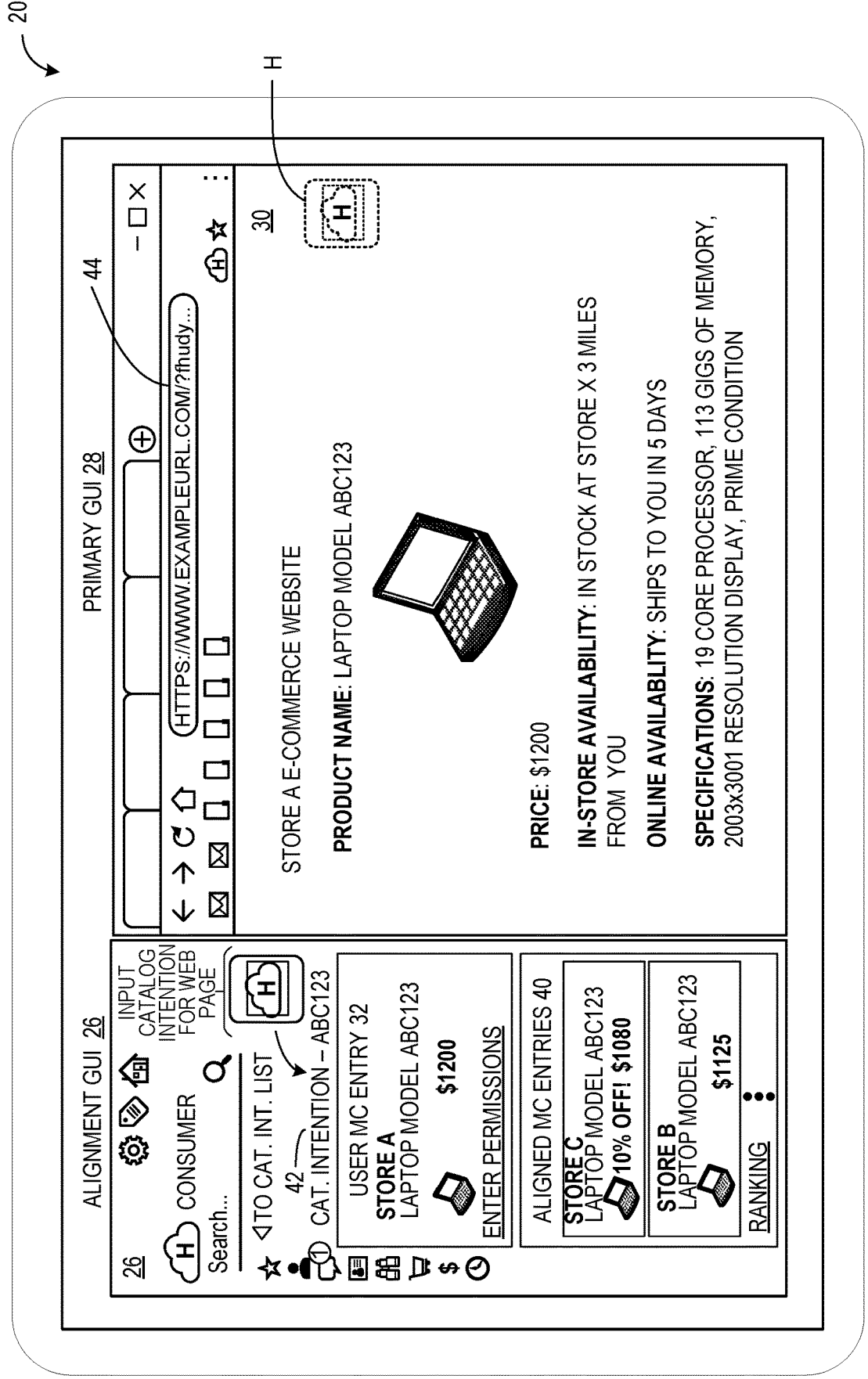
Figure 9I:
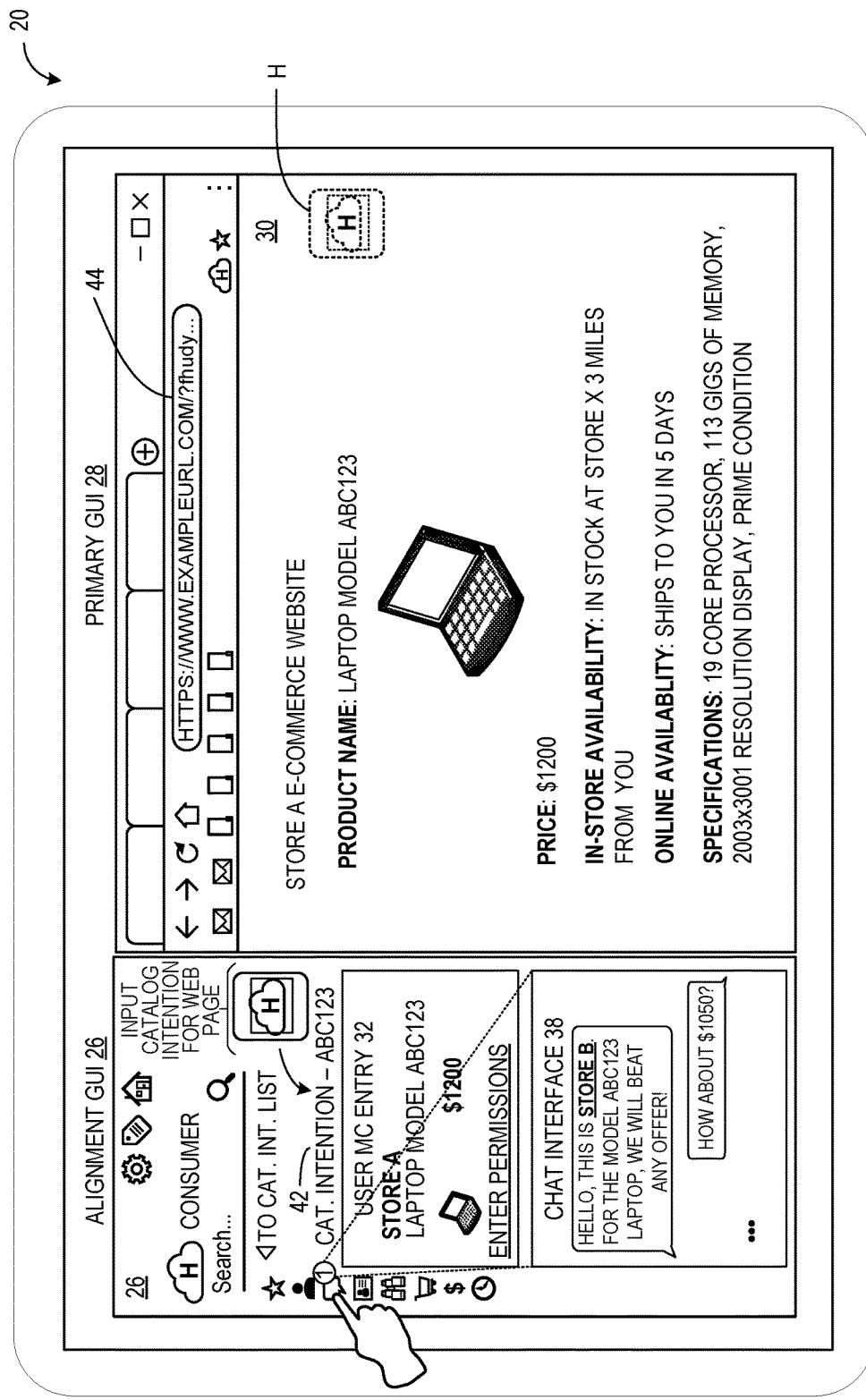

FIGS. 9A-9I illustrate an embodiment in which an alignment GUI 26 is displayed in a browser extension window and a primary GUI is displayed in a browser window, as shown in FIG. 4A. FIG. 9A illustrates entering user input of a catalog intention for a web page. It will be appreciated that the alignment GUI 26 may be selectively opened and closed by the user by selecting browser extension icon 49 in the ribbon (or toolbar) of the window of the browser 22 showing the primary GUI 28. The browser extension icon 49 may be referred to as a widget, in some examples. Once the alignment GUI 26 is opened and displayed, and while the web page 30 is displayed in the primary GUI 28, the user may select a catalog selector H, which causes the catalog intention 42 to be sent to the micro-catalog server 12. In one example implementation, selection of catalog selector H causes a catalog intentions interface 51 to be displayed, which includes a plurality of catalog intention categories 51A. In the depicted example, the catalog intention categories include need, want, like, dislike, have, buy, sell, rent, follow, learn, share, and future. The categories may be prepopulated with default values (such as "need" being initially selected and the remaining categories being initially unselected). In the depicted example, the categories of need, like and future are selected, and the user selects SUBMIT to proceed. It should be noted that each category of intention is given a corresponding value, which in one example is a positive or negative integer, such as +1 or −1. In the illustrated example, the user has selected need (+3), like (+1) and future (+2). When one or more intentions categories are selected by the consumer, the summed value of the constituent values for each selected category of intention constitutes an intention score. The intention score for the illustrated example is 6. The intention score is stored for analysis by micro-catalog server 12 and is also made available to third parties, subject to permissions 46. A higher score for a user would reveal that the user is more likely to engage with content that has been micro-cataloged, and act on the intentions by, for example, purchasing the product. Thus, the intention score helps consumers compare, evaluate, and ultimately make better choices by keeping track of the consumer's preferred wants, needs and interests. Further, third parties such as merchants may select a threshold level of interest in terms of a threshold intention score, for sending requests for third-party communications to users who have micro-cataloged a particular web page, as described in relation to FIG. 7B. As mentioned above, the catalog selector H may be displayed in the alignment GUI 26 or in the web page 30, if the web page 30 includes a widget or code enabling this feature. As shown in FIG. 9B, upon selection of the catalog selector H, a generated user micro-catalog entry 32 is received from the micro-catalog server 12 and displayed in the alignment GUI. The depicted user micro-catalog entry 32 includes information on the store name (STORE A), product information (LAPTOP MODEL ABC123), price ($1200) and a picture of the product. The micro-catalog entry 32 also includes a display of the intention score for the catalog intention 42 categories 51A inputted by the user. Thus, the catalog intention 42 for the displayed network-addressable content (i.e., web page 30) includes a subset of selected catalog intention categories 51A which are selected by the user from a set of candidate catalog intention categories (the entire list of categories 51A shown). The intention score for the user micro-catalog entry 32 is computed based upon the selected catalog intention categories (depicted with check marks). The third-party communication 36, such as a third-party micro-catalog entry or chat interface that is authorized by the permissions 46 includes an associated threshold intention score (shown as "4" in FIG. 7B). Thus, prior to presenting the third-party communication that is authorized by the permissions in the alignment GUI, that is, prior to presenting aligned micro-catalog entries 40 in FIGS. 9E and 9G for example, the micro-catalog alignment module 52 of the micro-catalog server 12 determines that the intention score of the user micro-catalog entry exceeds the threshold intention score, and based upon this determination, allows the third-party communication 36 to be displayed in the alignment GUI 26.

As shown in FIGS. 9C-9D, a user may select a enter permissions selector, which causes a permission interface 34 including a plurality of permissions selectors 180 to be displayed, by which the user may enter permissions 46 associated with the user micro-catalog entry 32. The selectors 180 including 182, 184, 186, 188, and 190 have been describe above, and will not be re-described for the sake of brevity. In addition to these selectors, a public private selector is included to allow a user to indicate whether the user micro-catalog entry will be viewable by other users of the system 5, or kept private.

As shown in FIG. 9E, once the permissions 46 have been entered, the alignment GUI will display other aligned micro-catalog entries 40 in the alignment GUI 26. In the example shown, the STORE B micro-catalog entry is shown, as well as a micro-catalog entry from a review site, both of which have been indexed by their creators to the URL of web page 30. It will be appreciated that STORE B micro-catalog entry was served according to a promotional campaign that was entered by the merchant in FIGS. 7A and 7B, which included a minimum threshold intention score of 4. Since the user's intention score in the example of FIGS. 9A-9I is 6, micro-catalog server 12 determined that the user's intention score exceeded the minimum threshold and allowed the third-party communication from STORE B in the form of the STORE B micro-catalog entry to be displayed as an aligned micro-catalog entry.

FIGS. 9F-9G illustrate entering ranking and filtering criteria for aligned micro-catalogs. Once the user selects a ranking and filtering selector, a ranking and filtering interface 35 is displayed. In the example depicted, various ranking criteria and filter criteria are displayed. The user has selected a ranking criteria of PRICE and not selected SPEED OF DELIVERY, REVIEW SCORES, SIZE OF VENDOR, or GEOGRAPHIC PROXIMITY, which are the other available ranking criteria in this example. Further, the user has selected to include categories of COMPUTERS and LAPTOPS, while excluding the merchant SHADYMERCHANT and the category of TABLETS.

As shown in FIG. 9H, once the ranking and filtering criteria are inputted, the ranker 64 and filter 62 of the micro-catalog server 12 operate to generate a list of ranked and filtered aligned micro-catalogs that meet the permissions 46, the ranking criteria 48 and the filtering criteria 47, and the URL 44. The ranked and filtered list of aligned micro-catalog entries is transmitted from the micro-catalog server 12 to the computing device 10, and once received is displayed in the alignment GUI 26.

As shown in FIG. 9I, a message waiting indicator over the chat icon on the left-hand side of the figure indicates that a chat message is waiting for the user. As discussed above, the chat message is one form of third-party communication, and this chat message is allowed by the permissions 46 entered by the user via the permissions interface 34 of FIG. 9D. Once the message indicator is selected by the user, the contents of the chat message are displayed in chat interface 38 in the alignment GUI 26. As shown, the chat message is from STORE B, a merchant (a type of third party authorized to send the user communications according to the permissions 46), and is an offer (a type of communication allowed by permissions 46) for the exact product the user has cataloged (a content type allowed by the permissions 46). The message tells the user that STORE B will "BEAT ANY PRICE." The user has sent a message back negotiating for $1050, which is less than the price offered by STORE C in FIG. H. A reply from STORE B is pending. In this way, the user can solicit offers from merchants according to permissions 46, and engage in chat-based negotiations to secure the best price, delivery terms, etc.

FIGS. 10A-10D illustrate an embodiment in which the alignment GUI 26A is displayed in a pane of a window of browser 22A and a primary GUI 28A is displayed in another pane of the same window, as shown in FIG. 4C. In the illustrated example, the user has navigated to web page 30 while running the browser extension 24, and the web page 30 has not yet been cataloged by the user. Although not shown in this figure, the alignment GUI 26A is selectively openable and closable by the user. The user can open the alignment GUI 26A by selecting browser extension icon 49 appearing in the ribbon of the window of the browser 22, and once again close it by further selecting the browser extension icon 49. As will be discussed below, once the web page 30 is cataloged by the user the state of the browser extension icon 49 will change.

A micro-catalog creation interface 39A is displayed by the browser extension 24 in the alignment GUI 26A. If the user desires to create a user micro-catalog entry 32A for the web page 30, the user may select the PUBLIC selector in the micro-catalog creation interface 40 to create a micro-catalog entry 32A associated with the web page 30 that will be publicly displayed by the micro-catalog server to third parties, for example via the search portal page shown in FIG. 12, as well as aligned as user micro-catalog entry 32A that is displayed in the user's alignment GUI 26. If the user wishes to align the web page 30 as a micro-catalog entry 32A without publicly sharing it, the user may select the PRIVATE selector to create a micro-catalog entry 32A that is displayed only as the user's alignment GUI 26, and not to any third party or other user.

Figure 10A:
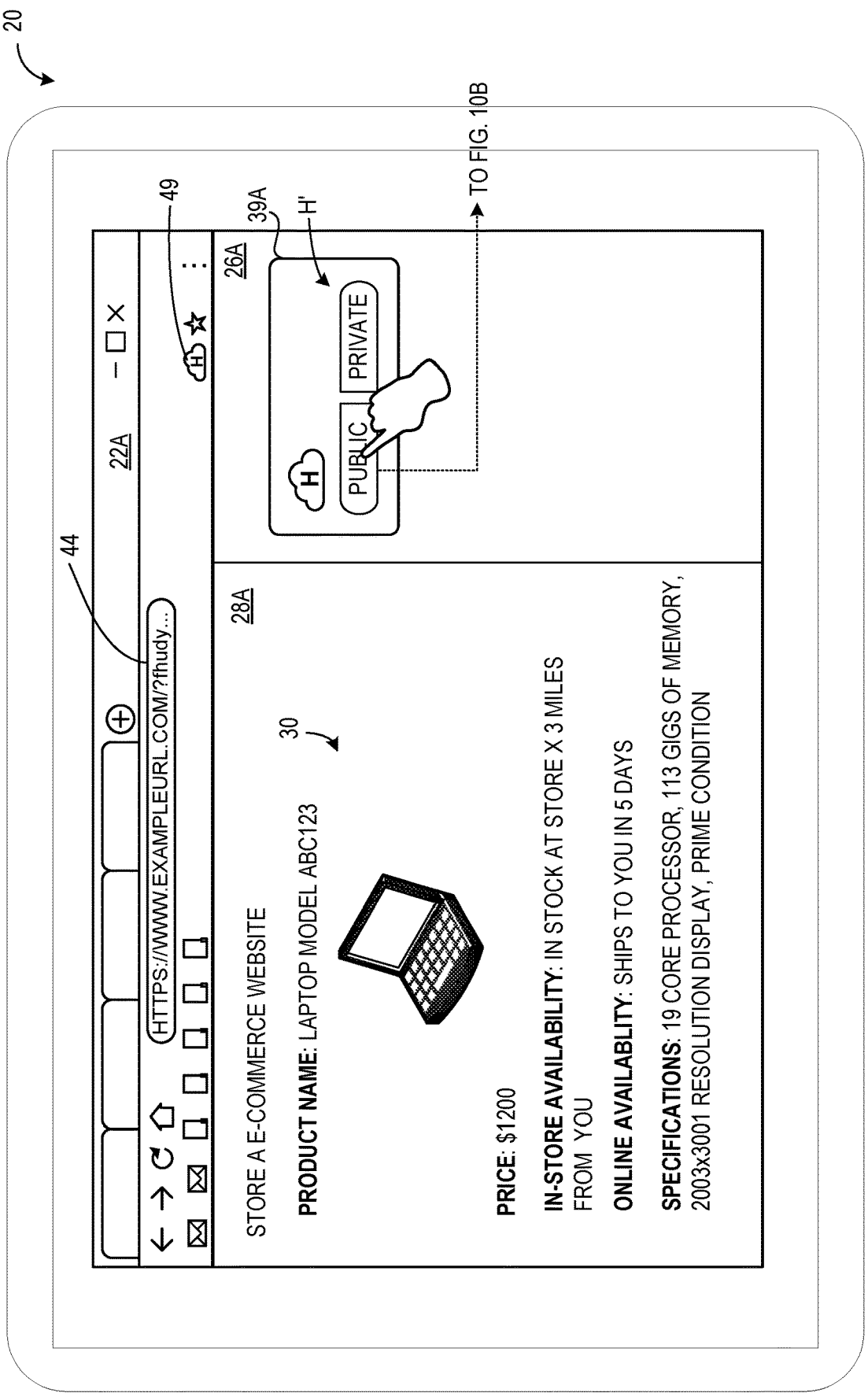
FIGS. 10A-10D illustrate an embodiment in which an alignment GUI is displayed in a pane of a browser window and a primary GUI is displayed in another pane of the same browser window, as shown in FIG. 4C. These figures illustrate a process of entering user input of a catalog intention for a web page (FIG. 10A), entering permissions associated with the user micro-catalog entry (FIG. 10B), entering categories associated with the micro-catalog entry (FIG. 10C), and displaying the micro-catalog entry (FIG. 10D).

As shown in FIG. 10A, in the alignment GUI 26A a catalog selector H' is displayed. The contents of the GUI 26A are served by the micro-catalog server 12 via the browser extension 24. Catalog selector H' includes a public selector and a private selector. Thus, the user may simultaneously select a public private privacy setting and a cataloging action with the selection of one of these selectors within the catalog selector H', to thereby input both a catalog intention 42A (see FIG. 10B) for a web page 30, as well as permissions 46A (also see FIG. 10B). In illustrated example, the user selects the public option, and the process flow proceeds to FIG. 10B.

Figure 10B:
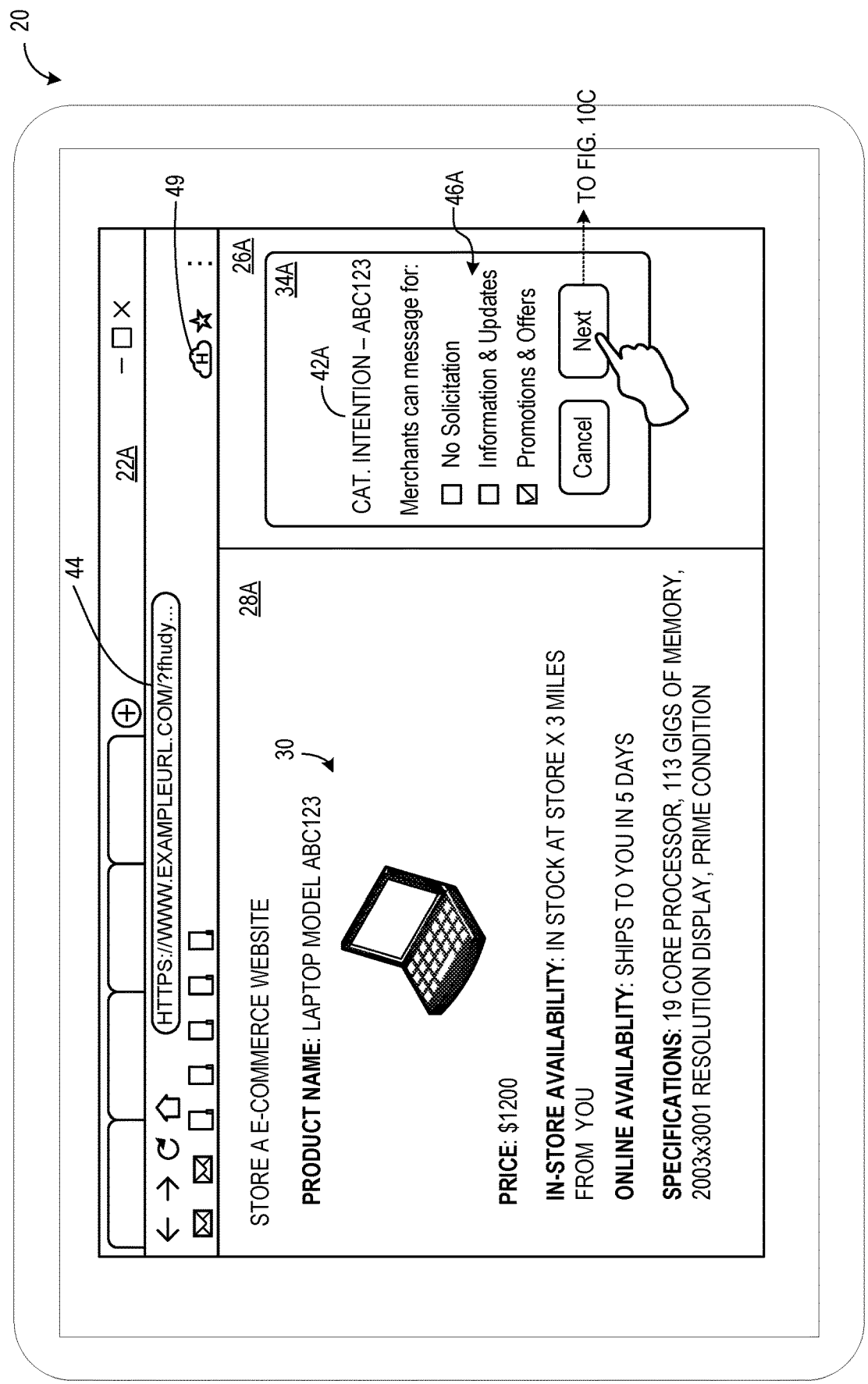

FIG. 10B illustrates a permissions interface 34A associated with the user catalog intention 42A for the web page 30. In permissions interface 34A, the user may choose between options for NO SOLICITATION, allow INFORMATION AND UPDATES, and allow PROMOTIONS AND OFFERS. In the illustrated example, the user has selected to allow promotions and offers. By selecting NEXT, the process flow proceeds to FIG. 10C. Permissible solicitations are conducted via the messaging module M6 of FIG. 2, according to the methods described above, for example, in relation to FIGS. 9A-9I.

Figure 10C:
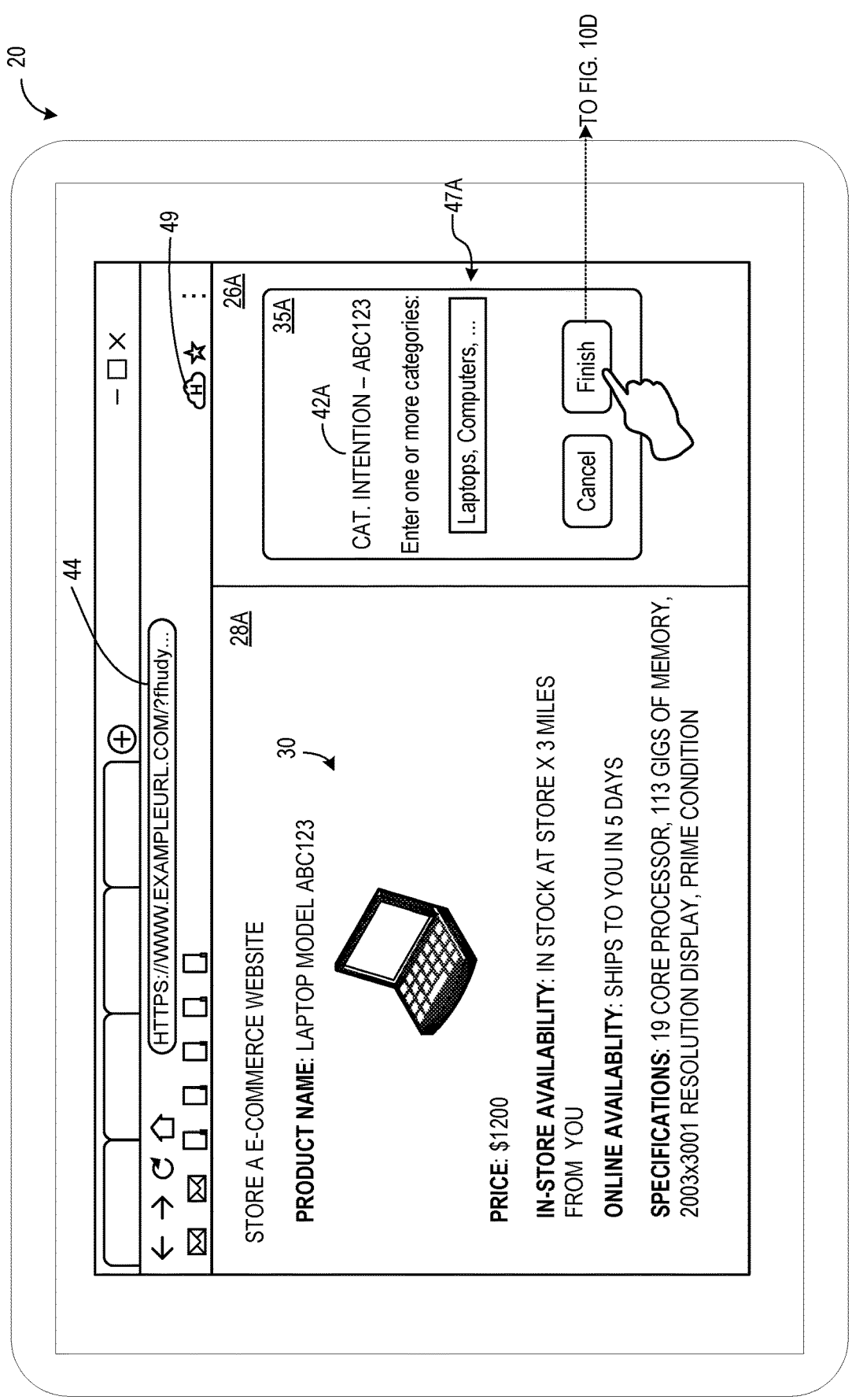

FIG. 10C illustrates a ranking and filtering interface 35A displayed in alignment GUI 26. In the ranking and filtering interface 35A, a category input field is provided for the user to enter categories associated with the micro-catalog entry. The user categories form filtering criteria 47A. Although not shown in this example, additional selectors may be provided in the ranking and filtering interface 35A by which the user may enter ranking criteria. The categories may be automatically populated and deletable/augmentable by the user or may auto-complete when the user starts typing in the field from among a library of pre-stored categories. Once the user is finished the user may select FINISH to proceed to cause the filtering criteria (i.e., the categories in this example) 47A to the micro-catalog server 12, which in turn generates a user micro-catalog entry 32A as shown in FIG. 10D.

Figure 10D:
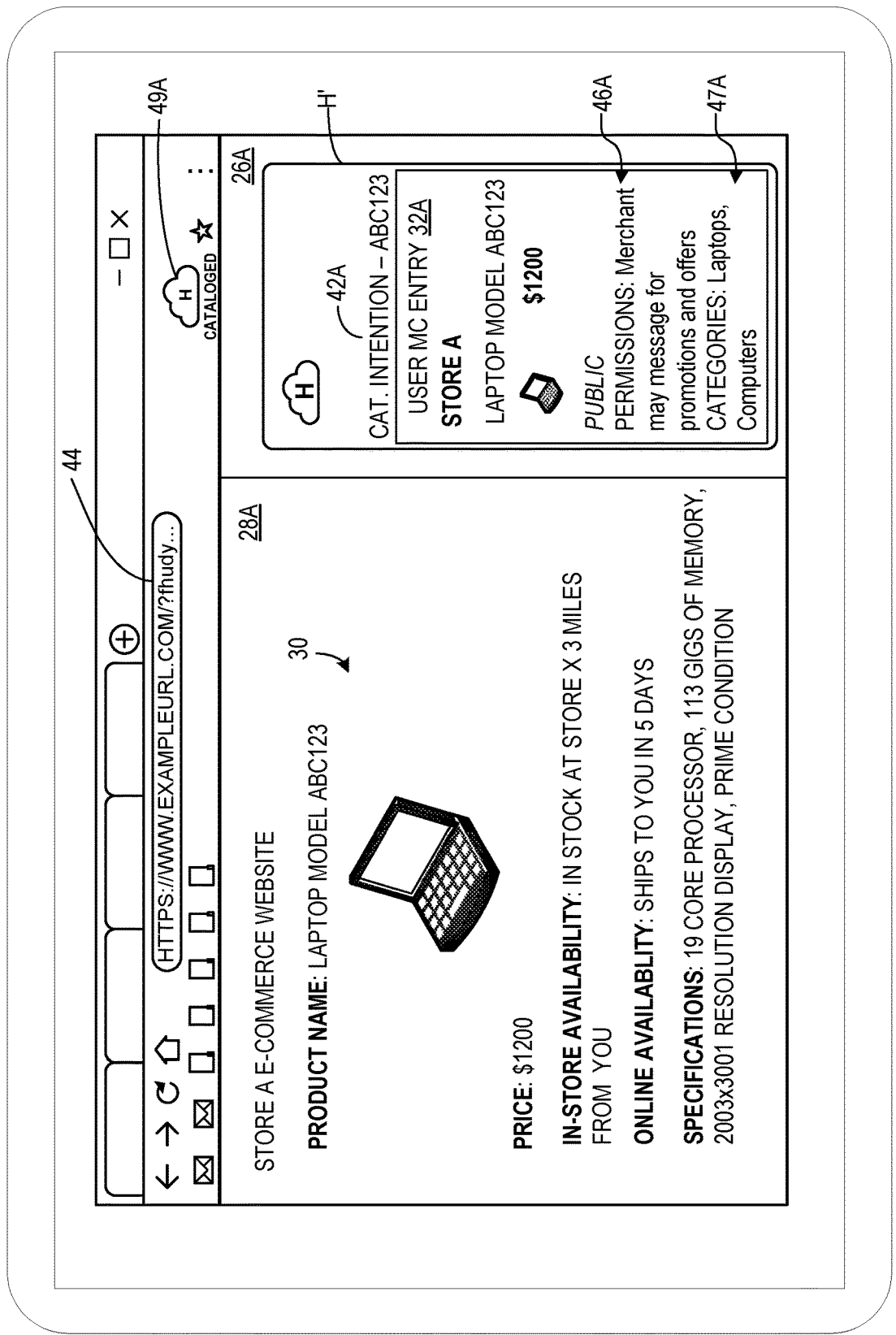

FIG. 10D illustrates that the alignment GUI 26A is configured to display the user micro-catalog entry 32A following receipt of the user micro-catalog entry 32A from the micro-catalog server 12. In user micro-catalog entry 32A, in addition to information such as the name (STORE A) of the merchant, the product name (LAPTOP MODEL ABC123), the price ($1200), and the image of the product, additional metadata in the form of the public/private setting, other permissions, and user inputted categories are displayed. In this manner, the user may easily visually inspect both the content of the original web page 30 that was cataloged, as well as the user permissions 46A and filtering criteria (i.e., categories in this example) 47A entered by the user for this micro-catalog entry 32A. Once the user has selected FINISH in FIG. 10C, it will be appreciated that the browser extension icon 49 transitions from to a state in which the word CATALOGED appears at 49A in FIG. 10D. This informs the user visually that the web page 30 has been cataloged by the user using the micro-catalog server 12.

It will be appreciated that the computing device 10 may be a mobile computing device, such as a smartphone, and the functionality of the browser extension 24 described above may be implemented in a stand-alone mobile application executed on the mobile computing device, such as mobile application 84 illustrated in FIG. 2. Thus, when using such a mobile application, the user may access mobile application by directly launching it. The mobile application 84 communicates with the micro-catalog server 12 to populate the user's intentions and display them in the alignment GUI 26, and allow the user to view the user micro-catalogs entries 32, to generate catalog intentions 42 for various web pages 30, and to view other aligned micro-catalog entries 40 shared by merchants and other users, and to create and share public micro-catalogs, as described above, using the mobile computing device. When the mobile computing device 210 is equipped with a camera, the user may use the camera to capture an image or scan a product via a QR code, for example. The image and/or scanned product can be micro-cataloged and a catalog intention 42 may be generated and sent to the micro-catalog server for appropriate communication with a merchant, for example.

As mentioned above with reference to FIG. 5, the landing page 31 associated with the micro-catalog server 12 may include selectable advisor portals for topics such as medical, travel, shopping, real estate, smart home systems, etc. Selecting an advisor portal topic may navigate to a portal page 48 to allow a consumer search for a sub-topic and to view their catalog intention 42 related to the selected portal topic, as well as curated micro-catalog entries associated with the portal topic. Advisor portals augment and enhance micro-catalog entries by allowing other micro-catalog entries to be aligned to them. Micro-catalog entries can be viewed in more than one advisor portal. For example, a micro-catalog entry could be in the shopping advisor and the travel advisor. The context of the advisor portal will influence what alignments can or should be made to other micro-catalogs within the advisor portal. It should also be noted that consumers can hide or show micro-catalogs within an advisor portal at their discretion. In addition to advisor portals, merchants may have their own portals which they can control and manage. Merchants can permit micro-catalog entries from other domains to be included in their merchant portal. A merchant can decide which third-party merchant may align micro-catalogs to the merchant's portal. Merchants can invite anonymous consumers using a temporary and unique private invite URL or public invite URL generated for the merchant to email or post using a QR code. Either way, both invitation types can be revoked by merchants as needed.

Figure 11:
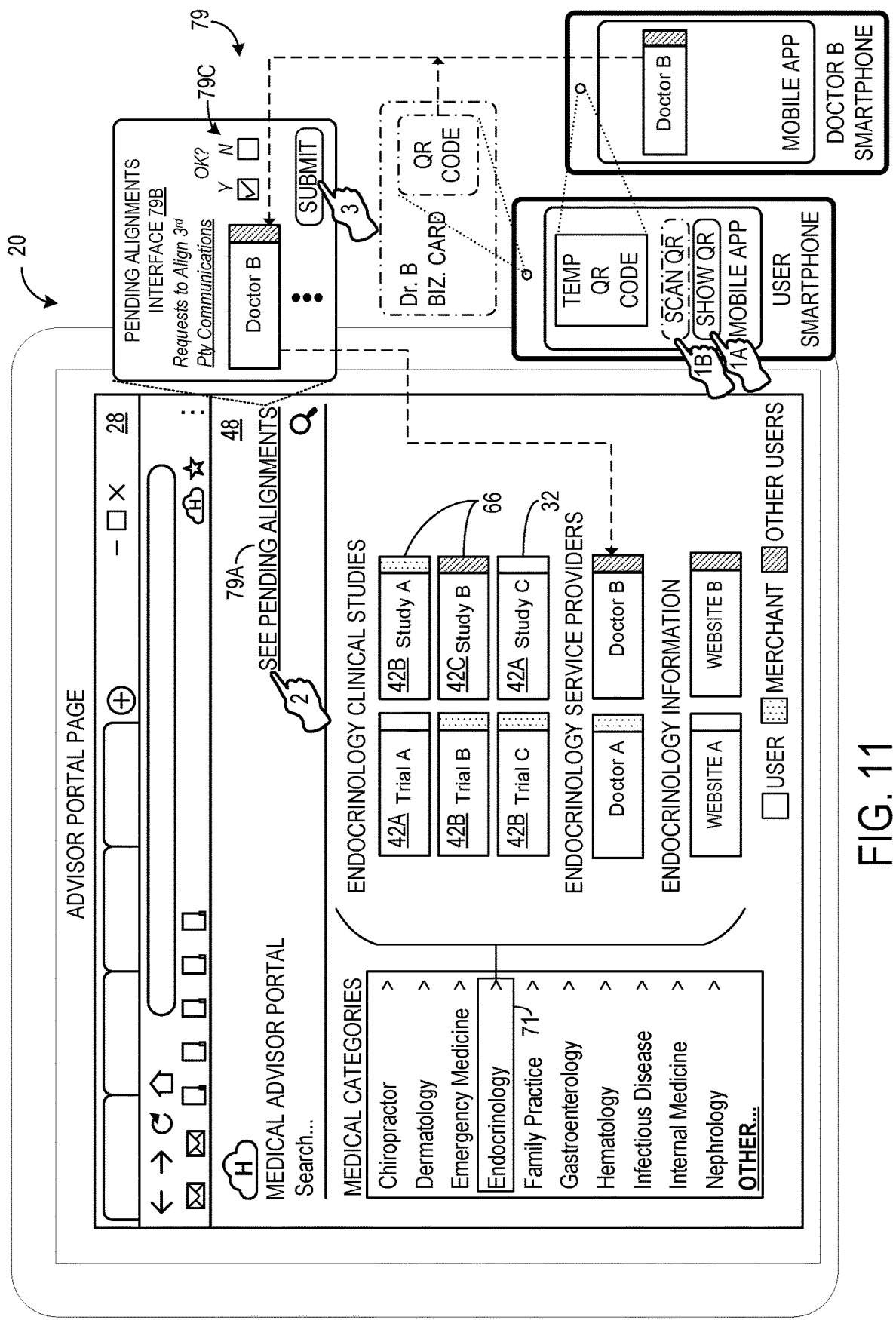
FIG. 11 shows an example graphical user interface of the system according to FIG. 1, in the form of an advisor portal page.

FIG. 11 shows an example graphical user interface of an advisor portal page 48 for a medical information displayed in the primary GUI 28. The advisor portal page includes a list of medical categories that the user may browse, and a list of micro-catalog entries that have been cataloged as belonging to each of the categories. The category list is extensible, enabling users of the system 5 to add new categories by selecting the OTHER selector. A search tool is provided to search among micro-catalog entries of the various categories. Upon selection of a particular selected category 71 by the user, the advisor portal page is configured to display a list of micro-catalog entries associated with the selected category. As shown, the displayed micro-catalog entries include user micro-catalog entries 32 and third-party micro-catalog entries 66 from both merchants and other users.

In the depicted example, the user has selected ENDOCRINOLOGY, and the displayed micro-catalog entries 32, 66 related to this topic include micro-catalogs related to clinical trials and studies, service providers, and information sources such as websites. To provide a visual indication of the source of the micro-catalog entries, a key is provided along with visual indicators, which may include a respective color, shading, design, etc. for each source. The depicted key indicates which visual indicators are associated with users, merchants, and other users.

In addition, the system 5 may also allow a certified medical provider to provide targeted information to a patient, i.e., a consumer, via the chat interface 38 above, or other suitable secure communication channel, such as an electronic business card or the like. In a first option shown at 1A, the consumer may use their medical advisor portal of FIG. 11, and reveal a temporary QR code to be scanned by the certified medical provider. Examples of such information may include International Statistical Classification of Diseases (ICD) codes, details or treatments for a specific condition, pre- or post-operation instructions, and resources for addressing a medical issue, for example. It should be noted that the platform will grant the authority to align medical codes by medically licensed professionals. When the certified medical provider scans such a temporary medical advisor QR code (TEMP QR CODE) generated by selecting SHOW QR selector of the mobile app instance executed on the user's smartphone and then shown to the medical provider. The merchant medical provider (e.g., Doctor B) then reads the TEMP QR CODE via a mobile application on the merchant's mobile device (e.g., smartphone or tablet) creates a private user micro-catalog entry 32 that will remain as a pending alignment 79 until accepted or rejected by the consumer from the user computing device (e.g., user smartphone or tablet). The pending alignments 79 can be viewed by the user by selecting a pending alignment selector 79A in either the browser 22 or mobile application, either of which displays a pop-up or other pending alignment interface 79B, in which a list of pending alignments 79 is displayed, along with acceptance selectors 79C for accepting the pending alignments 79. Once the pending alignment is approved by the user, it will remain aligned until permanently deleted by the user. Under a second scenario, it should also be appreciated that the Merchant's QR code may be printed on electronic publications, e.g., on web pages and electronic brochures, or on printed materials available in the service provider offices, for example. The user may appreciate the benefit of easily obtaining the business card and other micro-catalogs that may be presented by scanning the QR code with the user's smartphone camera as shown at 1B. Under this option, the user can rest assured that the information presented via the micro-catalog server 12 is vetted and verified by the medical provider and other medical professionals and organizations. It should also be appreciated that in some situations, a patient/consumer may want to give permission to a certified medical provider to attest that a specific medical test or procedure was performed. This is especially useful when the patient/consumer is required to prove the attestation for a later date and time to a third party. One way the attestation can be achieved is as follows. 1) The consumer selects a micro-catalog they want to request attestation for from their medical advisor. 2) The consumer is asked to take a picture of their photo ID or a so-called "selfie" if the user has a personal mobile computing device using a mobile application (a template will appear on the camera screen in-app with instructions for taking the "selfie"). It should be noted that this must be done in front of the person providing the attestation, for verification. The certified medical provider scans the micro-catalog QR code generated for the attestation request. 3) The certified medical provider is instructed to verify that the actual photo ID truly identifies the patient/consumer. If all matches up, then the certified medical provider confirms the attestation on their mobile computing device. It is important to note that the photo ID is stored to the patient/consumer's mobile device only. It cannot be accessed by anyone unless the patient/consumer allows access. It is encrypted until the patient/consumer decrypts it. If the patient/consumer wants to give permission to a third party to validate the attestation, they can show the micro-catalog's QR code to the third party for scanning. Once scanned, the micro-catalog attested to will be displayed via a secure web page on the third party's mobile computing device. It reveals no personally identifying information (PII) or personal health information (PHI) and can only be unlocked by a temporary code displayed on the consumer's mobile computing application. The temporary code along with the photo ID or "selfie" which were taken at the time of the attestation is never transmitted to any another party or to the system 5. The third party may ask to see additional ID, or the original photo to validate that it truly is same person. This demonstrates how anonymous permission-based micro-catalogs can interact in real-world situations. It should also be noted that this is one example, the same process could be achieved and appreciated by other professionals in a variety of industries.

It will be appreciated that if a patient is not a registered user of the system 5 and is given an unclaimed QR code with aligned third-party micro-catalogs 66, the user will be prompted to register and accept or reject the pending alignments upon scanning the QR code with the user's mobile application program 84. The medical provider may also align micro-catalogs to a patient/consumer QR code in their presence and with their permission, without requiring any HIPAA identifiers or PII. If any third-party merchants are associated with the micro-catalogs 66 provided by the medical provider, the user may choose to define if and how these third-party merchants may contact them, as described above with reference to FIG. 9D.

Figure 12:
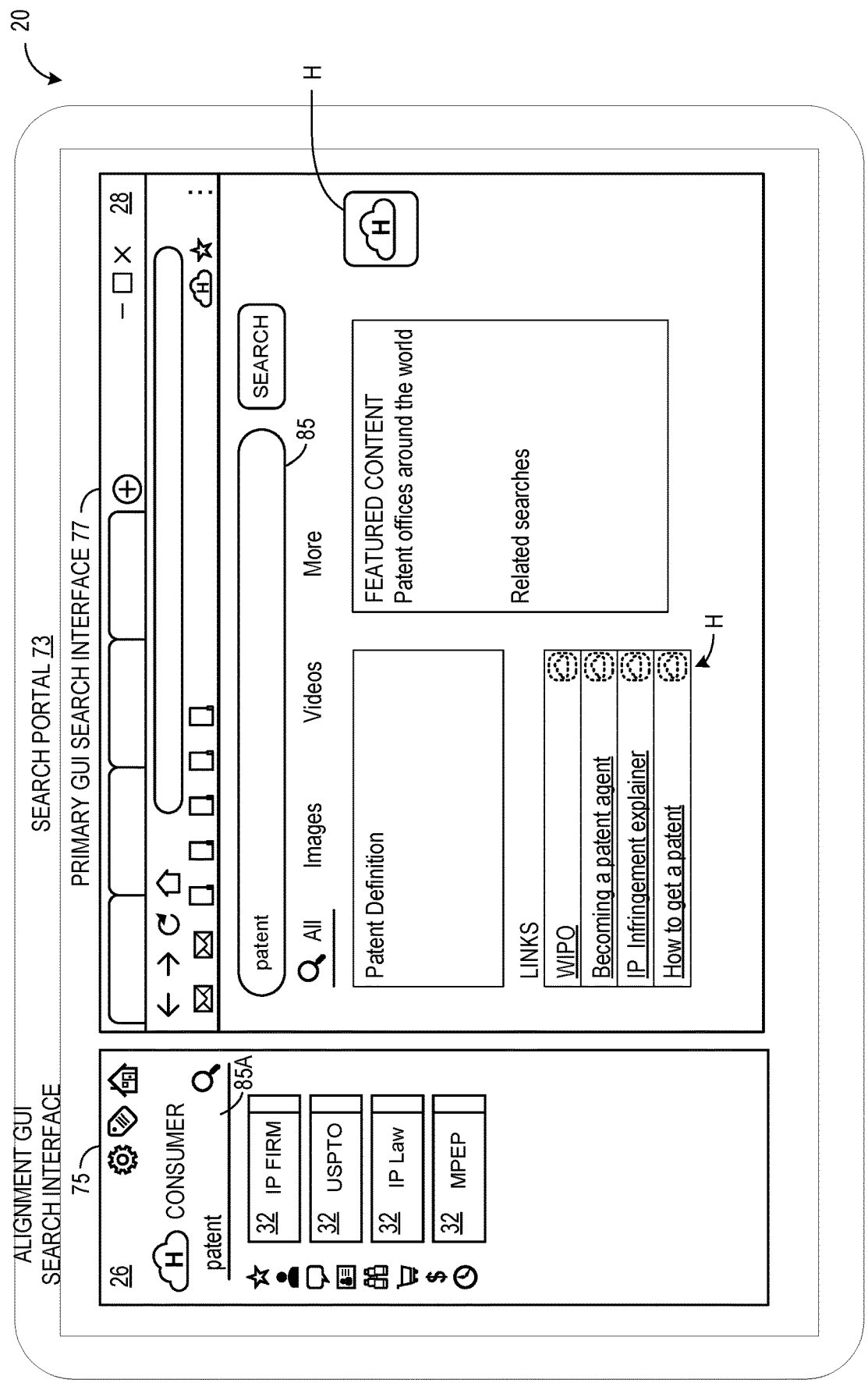
FIG. 12 shows an example graphical user interface of the system according to FIG. 1, in the form of a search portal.

Turning now to FIG. 12, an example graphical user interface of the system according to FIG. 1 is illustrated, in the form of a search portal 73 for a search operation. The search portal 73 includes an alignment GUI search interface 75 displayed in the alignment GUI 26 and also a primary GUI search interface 77 displayed in the primary GUI 28. The alignment GUI search interface 75 is served by the micro-catalog server 12, and returns search results from within user micro-catalog entries 32 that have been generated based on the user's catalog intentions 42. On the other hand, the primary GUI search interface 77 may be served by the search module M5 of micro-catalog server 12 or alternatively by a third-party search engine, and returns results of (1) all public micro-catalog entries (in the case of micro-catalog server 12 executing the search) or (2) public internet search results (in the case of a third-party search engine executing the search). In either case, a catalog selector H may be displayed adjacent the search results in the primary GUI search interface, and by selecting of the catalog selector H the user may generate a micro-catalog entry for the search results page. The catalog selector H may be served by the micro-catalog server 12, or by the search engine using an appropriate embedded URL in the search results page, as appropriate. In some embodiment, a separate catalog selector H may be provided for each corresponding search result among the search results, so the user may select an appropriate selector to catalog on a link-by-link basis among the search results, as shown in dashed lines.

In the depicted example of FIG. 12, the user has entered the search term "patent" in a search bar 85 of the primary GUI search interface 77 displayed in the primary GUI 28. Upon entry of a search term and selection of the SEARCH button, the search module M5 or third-party search engine generates search results related to the search term, which are displayed in the primary GUI 28. The search results may include a definition of the search term, links to popular resources, related searches, and the like. In the depicted example links to the World Intellectual Property Office (WIPO), a web page with information on BECOMING A PATENT AGENT, a web page with an IP INFRINGEMENT EXPLAINER, a web page on HOW TO GET A PATENT.

Similarly, the user has entered "patent" in a search bar 85A of the alignment GUI search interface 75, and micro-catalog entries 32 previously cataloged by the user and sharing the category of "patent" are displayed in the alignment GUI 26, such as, a link to an intellectual property law firm, a link to the United States Patent Office (USPTO), a link to a web page with information about intellectual property rights, and a link to the Manual of Patent Examining Procedure (MPEP), for example. As described above, the user may choose to filter the micro-catalog entries in the search results of the alignment GUI search interface 75 by time, price, tags, keywords, favorites, exclusivity, alphabetical order, highest level of interest, location, trending, or the like. The consumer may also choose to delete one or more micro-catalog entries 32, or to add a new user micro-catalog entry 32 from the search result in the primary GUI search interface 77.

In any of the embodiments described herein, it will be appreciated that the system 5 allows for anonymous bi-directional messaging between a merchant and one or more consumers having entered permissions associated with a user micro-catalog entry that allow the third party to send a third-party communication 36 to the user. Additionally, as described above, the parameters for solicitation may be specific to the micro-catalog entry 32, and the content of the message and/or the features provided via the message may depend upon the method or metrics of the alignment, such as the item that was aligned and where, when, how, and why the micro-catalog entry 32 was created. Further, in a real-world example, a consumer may scan a QR code on a product as a catalog intention 42, to thereby generate a micro-catalog entry, and enter associated permission 46 allowing the merchant to contact them. If the micro-catalog entry 32 is created based on a catalog intention 42 generated at the location of the product, as determined by geo-location, the merchant may, if permitted, provide the consumer with a coupon to be used immediately.

Figure 13:
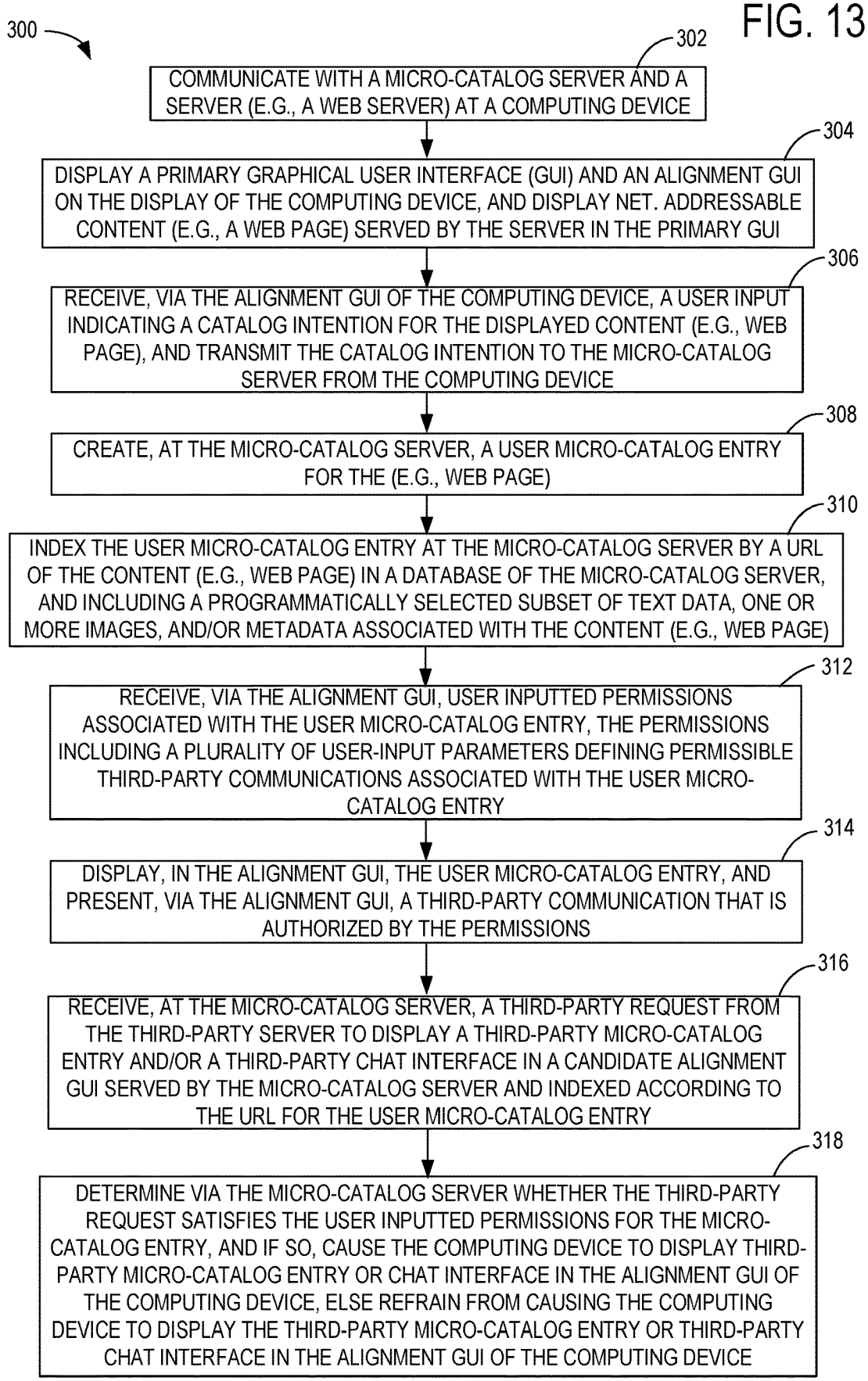
FIG. 13 shows a flowchart of a computerized permission-based communications method, according to one embodiment of the present disclosure.

FIG. 13 shows a flowchart of an example computerized permission-based communications method 300 according to one example of the present disclosure. The method 300 may be implemented using the hardware and software components of system 5 described above, or other suitable hardware and software components.

At step 302, the method 300 may include communicating, at a computing device, with a micro-catalog server and a web server. At step 304, the method 300 may further include displaying a primary graphical user interface (GUI) and an alignment GUI on the display of the computing device, and displaying network-addressable content (e.g., a web page) in the primary GUI of the computing device. At step 306, the method 300 may further include receiving, via the alignment GUI of the computing device, a user input indicating a catalog intention for the displayed network-addressable content (e.g., web page) at the computing device and transmitting the catalog intention to the micro-catalog server from the computing device. At step 308, the method 300 may further include creating, at the micro-catalog server, a user micro-catalog entry for the network-addressable content (e.g., web page) in response to receiving the catalog intention.

At step 310, the method 300 may further include indexing the user micro-catalog entry at the micro-catalog server by an index value of the network-addressable content (e.g., a URL of the web page) in a database of the micro-catalog server, and including a programmatically selected subset of text data, one or more images, and/or metadata associated with the network-addressable content (e.g., web page). At step 312, the method may further include receiving, via the alignment GUI, user inputted permissions associated with the user micro-catalog entry at the computing device. The user inputted permissions include a plurality of user-input parameters defining permissible third-party communications associated with the user micro-catalog entry. At step 314, the method 300 may further include displaying, in the alignment GUI, the user micro-catalog entry and presenting, via the alignment GUI, a third-party communication that is authorized by the permissions at the computing device.

At step 316, the method 300 may further include receiving, at the micro-catalog server, a third-party request from the third-party computing device to display a third-party micro-catalog entry and/or a third-party chat interface in a candidate alignment GUI served by the micro-catalog server and indexed according to index value (e.g., the URL) for the user micro-catalog entry. It will be appreciated that the request received at 316 may be received as part of a promotional campaign defined by associated promotional criteria entered by the third party, and thus may be received earlier in the execution of method 300, such as prior to step 302. Alternatively, the step of receiving the request at 316 may occur after step 314 as shown. At step 318, the method 300 may further include determining via the micro-catalog server whether the third-party request satisfies the user inputted permissions for the micro-catalog entry, and if so, cause the computing device to display third-party micro-catalog entry or chat interface in the alignment GUI of the computing device, else refrain from causing the computing device to display the third-party micro-catalog entry or third-party chat interface in the alignment GUI of the computing device. Similarly to the timing of step 316, it will be appreciated that step 318 may be performed earlier in the method in some situations, although it is usually performed after step 316 and after the user micro-catalog entry has been generated.

The systems and methods described above implement permission-based alignment of third-party communications including micro-catalog entries and chat sessions in an anonymous manner, taking into account choices made by the user when expressing the user's intentions regarding content that has been cataloged. The system enables a parallel Internet for each user of the Internet to maintain anonymity as they curate and control their intentions online. This is achieved by micro-cataloging one's intentions. Micro-catalogs can be aligned for anonymous permission-based engagement and communication without interference from the aligned media. This permission-based Internet experience ensures a safer and more efficient use of the Internet. By using anonymous permission-based micro-catalog entries aligned to such network addressable content such as web pages, a parallel personal Internet of intentions giving users privacy, permission, and choice is enabled. Micro-catalog entries can be safely, privately, and anonymously engaged. Micro-catalog entries can also displace traditional online advertising by allowing bidirectional communication to spontaneously occur via the micro-catalog server. A single micro-catalog may be anonymously curated, created and controlled. A micro-catalog incapsulates a unit of intention by hosting its metadata, intentionizations, solicitations and shares. In this way, the micro-catalog server system described above can enhance the user experience and improve opportunities for third parties to communicate with internet users in an anonymous manner that is aligned with the user's intentions.

In some embodiments, the methods and processes described herein may be tied to a computing system of one or more computing devices. In particular, such methods and processes may be implemented as a computer application program or service, an application-programming interface (API), a library, and/or other computer program product.

Figure 14:
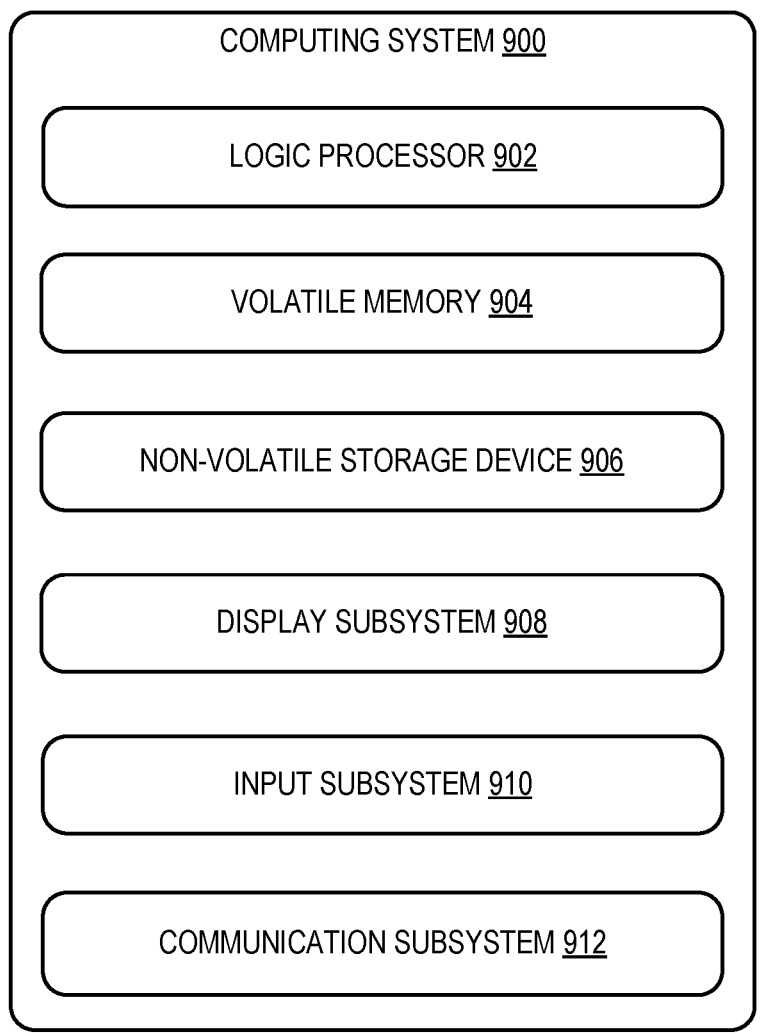
FIG. 14 is a schematic diagram of an example computing environment that may be used to implement one or more of the computing devices of the system of FIG. 1.

FIG. 14 schematically shows a non-limiting embodiment of a computing system 900 that can enact one or more of the methods and processes described above. Computing system 900 is shown in simplified form. Computing system 900 may embody the computing device 10, micro-catalog server 12, web server 14, a computer storing database 54, and third-party computing device 70 and other computing devices described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 14.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed, e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computerized anonymous permission-based communications system, comprising:
   a computing device configured to communicate with a micro-catalog server and a server, the computing device including a processor, memory, and a display, wherein the processor is configured to execute instructions using portions of the memory, to:
   display a primary graphical user interface (GUI) and an alignment GUI on the display of the computing device;
   display, in the primary GUI, network-addressable content served by the server;
   receive, via the alignment GUI, a user input indicating a catalog intention for the displayed network-addressable content, the catalog intention being transmitted to the micro-catalog server to cause the micro-catalog server to create a user micro-catalog entry for the network-addressable content, the user micro-catalog entry being indexed at the micro-catalog server by an index value of the network-addressable content in a database of the micro-catalog server, and including a programmatically selected subset of text data, one or more images, and/or metadata associated with the network-addressable content;

receive, via the alignment GUI, user inputted permissions associated with the user micro-catalog entry, the permissions including a plurality of user-input parameters defining permissible third-party communications associated with the user micro-catalog entry;

display, in the alignment GUI, the user micro-catalog entry;

present, via the alignment GUI, a third-party communication that is authorized by the permissions; and restrict presentation of third-party communications that are not authorized by the permissions, wherein the micro-catalog server is configured to serve a permissions interface of the alignment GUI that is displayed on the computing device, the permissions interface including at least three selectors, each selector configured to receive one of the user-input parameters defining the permissions, wherein the at least three selectors include:
  a communication mode permission selector configured to receive user input of a communication mode including messaging, voice, and/or micro-catalogs;
  a communication type permission selector configured to receive user input of a communication type including promotion and/or offers; and
  a time period permission selector configured to receive user input of a time period during which the third-party communication is authorized.

2. The system of claim 1, wherein:
the server is a web server;
the network-addressable content is a web page; and
the index value is a URL.

3. The system of claim 2, wherein
the micro-catalog server is configured to receive a third-party request from the third-party computing device to display a third-party micro-catalog entry and/or a third-party chat interface in a candidate alignment GUI served by the micro-catalog server and indexed according to the URL for the user micro-catalog entry, and
the micro-catalog server is configured to determine whether the third-party request satisfies the user inputted permissions for the micro-catalog entry, and if so, cause the computing device to display third-party micro-catalog entry or chat interface in the alignment GUI of the computing device, else refrain from causing the computing device to display the third-party micro-catalog entry or third-party chat interface in the alignment GUI of the computing device.

4. The system of claim 2, wherein
the metadata for the user micro-catalog entry includes a title of the web page, a price of a good or service offered on the web page, and/or a geographical location of an entity featured on the web page.

5. The system of claim 2, further comprising a database including one or more database records for the user micro-catalog entry that includes a public URL for the web page, a micro-catalog URL for the user micro-catalog entry, a user ID for the user, and/or the permissions for the user micro-catalog entry.

6. The system of claim 2, wherein
the micro-catalog server is configured to receive multiple third-party requests to create multiple third-party micro-catalog entries or third-party chat interface instances that are indexed by the URL of the web page, and the presented third-party communication is a target third-party micro-catalog entry or a target third-party chat interface instance among the multiple third-party micro-catalog entries or third-party chat interface instances; and the micro-catalog server is configured to filter the multiple third-party micro-catalog entries or third-party chat interface instances based upon the permissions entered via the permissions interface to thereby generate a set of filtered third-party micro-catalog entries or third-party chat interface instances, and rank the filtered micro-catalog entries or third-party chat interface instances according to a ranking criteria entered by the user, to thereby display a ranked list of filtered third-party micro-catalogs entries or third-party chat interface instances that are indexed by the URL in the alignment GUI, wherein the displayed ranked list includes the target third-party micro-catalog entry or target third-party chat interface instance.

7. The system of claim 6, wherein the ranking criteria selected by the user are selected from the group consisting of price, geographic proximity and reviews.

8. The system of claim 2, wherein
the web page is a search engine interface; and
the user micro-catalog entry includes a search query results page for a search query entered into the search engine interface.

9. The system of claim 2, wherein
the primary GUI is displayed in a primary GUI of the computing device, and the alignment GUI is displayed in a separate primary GUI of the computing device via a browser extension.

10. The system of claim 2, wherein
the primary GUI is displayed in a same window of a browser as the alignment GUI, and the contents of the primary GUI and/or alignment GUI are received via an asynchronous transfer protocol.

11. The system of claim 2, wherein
the permissible third-party communications include bi-directional messaging via the third-party chat interface.

12. The system of claim 1, wherein
the catalog intention for the displayed network-addressable content includes a subset of selected catalog intention categories which are selected by the user from a set of candidate catalog intention categories;
an intention score for the user micro-catalog entry is computed based upon the selected catalog intention categories; and
the third-party communication that is authorized by the permissions includes an associated threshold intention score; and
prior to presenting the third-party communication that is authorized by the permissions in the alignment GUI, it is determined that the intention score of the user micro-catalog entry exceeds the threshold intention score.

13. A computerized anonymous permission-based communications system, comprising:
a micro-catalog server configured to communicate with a computing device and a third-party computing device, the micro-catalog server including a processor and memory, wherein the processor is configured to execute instructions using portions of the memory, to:
receive a catalog intention transmitted from the computing device;

in response to receiving the catalog intention, create a user micro-catalog entry for network-addressable content, the user micro-catalog entry including a programmatically selected subset of text data, one or more images, and/or metadata associated with the network-addressable content;

index the user micro-catalog entry by an index value of the network addressable content in a database of the micro-catalog server;

serve a permissions interface that is displayed on the computing device, the permissions interface being configured to receive user input permissions defining permissible third-party communications associated with the user micro-catalog entry, the permissions interface including at least three selectors for user input of the permissions, each selector being configured to receive user input of a respective user-input parameter included in the permissions, wherein the at least three selectors include:

a communication mode permission selector configured to receive user input of a communication mode including messaging, voice, and/or micro-catalogs, as a first user-input parameter of the permissions;

a communication type permission selector configured to receive user input of a communication type including promotion and/or offers, as a second user-input parameter of the permissions; and a time period permission selector configured to receive user input of a time period during which a third-party communication is authorized, as a third user-input parameter of the permissions;

receive from the computing device the user inputted permissions associated with the user micro-catalog entry;

select a third-party communication to be displayed in an alignment GUI of the computing device based on the permissions;

cause the computing device to display the selected third-party communication in the alignment GUI of the computing device, while the network addressable content is displayed in the primary GUI; and cause the computing device to restrict display of other of the third-party communications that are not authorized by the permissions.

14. The system of claim 13, wherein:
the server is a web server;
the network-addressable content is a web page; and
the index value is a URL.

15. The system of claim 14, wherein
the micro-catalog server is configured to receive a third-party request from the third-party computing device to display a third-party micro-catalog entry and/or a third-party chat interface in a candidate alignment GUI served by the micro-catalog server and indexed according to the URL for the user micro-catalog entry, and
the micro-catalog server is configured to determine whether the third-party request satisfies the user inputted permissions for the micro-catalog entry, and if so, cause the computing device to display third-party micro-catalog entry or chat interface in the alignment GUI of the computing device, else refrain from causing the computing device to display the third-party micro-catalog entry or third-party chat interface in the alignment GUI of the computing device.

16. The system of claim 14, wherein
the metadata for the user micro-catalog entry includes a title of the web page, a price of a good or service offered on the web page, and/or a geographical location an entity featured on the web page.

17. The system of claim 14, further comprising a database including one or more database records for the user micro-catalog entry that includes a public URL for the web page, a micro-catalog URL for the user micro-catalog entry, a user ID for the user, and/or the permissions for the user micro-catalog entry.

18. The system of claim 14, wherein
the micro-catalog server is configured to receive multiple third-party requests to create multiple third-party micro-catalog entries or third-party chat interface instances that are indexed by the URL of the web page, and the presented third-party communication is a target third-party micro-catalog entry or a target third-party chat interface instance among the multiple third-party micro-catalog entries or third-party chat interface instances; and
the micro-catalog server is configured to filter the multiple third-party micro-catalog entries or third-party chat interface instances based upon the permissions entered via the permissions interface to thereby generate a set of filtered third-party micro-catalog entries or third-party chat interface instances, and rank the filtered micro-catalog entries or third-party chat interface instances according to a ranking criteria entered by the user, to thereby display a ranked list of filtered third-party micro-catalogs entries or third-party chat interface instances that are indexed by the URL in the alignment GUI, wherein the displayed ranked list includes the target third-party micro-catalog entry or target third-party chat interface instance.

19. The system of claim 18, wherein the ranking criteria selected by the user are selected from the group consisting of price, geographic proximity and reviews.

20. The system of claim 14, wherein
the web page is a search engine interface; and
the user micro-catalog entry includes a search query results page for a search query entered into the search engine interface.

21. The system of claim 14, wherein
the primary GUI is displayed in a primary GUI of the computing device, and the alignment GUI is displayed in a separate primary GUI of the computing device via a browser extension.

22. The system of claim 14, wherein
the permissible third-party communications include bi-directional messaging via the third-party chat interface.

23. A computerized permission-based communications method, comprising:
communicating, at a computing device, with a micro-catalog server and a web server;
displaying a primary graphical user interface (GUI) and an alignment GUI on the display of the computing device;
displaying, in the primary GUI of the computing device, a web page served by the web server;
receiving, via the alignment GUI of the computing device, a user input indicating a catalog intention for the displayed web page;
transmitting the catalog intention to the micro-catalog server from the computing device;
creating, at the micro-catalog server, a user micro-catalog entry for content at the web page;
indexing the user micro-catalog entry at the micro-catalog server by a URL of the web page in a database of the micro-catalog server, and including a programmatically selected subset of text data, one or more images, and/or metadata associated with the web page;

serving a permissions interface that is displayed on the computing device, the permissions interface being configured to receive user input permissions defining permissible third-party communications associated with the user micro-catalog entry, the permissions interface including at least three selectors for user input of the permissions, each selector being configured to receive user input of a respective user-input parameter included in the permissions, wherein the at least three selectors include:

a communication mode permission selector configured to receive user input of a communication mode including messaging, voice, and/or micro-catalogs, as a first user-input parameter of the permissions;

a communication type permission selector configured to receive user input of a communication type including promotion and/or offers, as a second user-input parameter of the permissions; and a time period permission selector configured to receive user input of a time period during which a third-party communication is authorized, as a third user-input parameter of the permissions;

receiving, via the alignment GUI, the user inputted permissions associated with the user micro-catalog entry;

displaying, in the alignment GUI, the user micro-catalog entry;

presenting, via the alignment GUI, the third-party communication that is authorized by the permissions; and causing the computing device to restrict display of other of the third-party communications that are not authorized by the permissions.

24. The method of claim 23, further comprising:

receiving, at the micro-catalog server, a third-party request from the third-party computing device to display a third-party micro-catalog entry and/or a third-party chat interface in a candidate alignment GUI served by the micro-catalog server and indexed according to the URL for the user micro-catalog entry; and determining via the micro-catalog server whether the third-party request satisfies the user inputted permissions for the micro-catalog entry, and if so, cause the computing device to display third-party micro-catalog entry or chat interface in the alignment GUI of the computing device, else refrain from causing the computing device to display the third-party micro-catalog entry or third-party chat interface in the alignment GUI of the computing device.

\* \* \* \* \*